(12) United States Patent
Ooi et al.

(10) Patent No.: US 11,438,074 B2
(45) Date of Patent: Sep. 6, 2022

(54) ULTRAVIOLET DETECTION WITH HIGH-SPEED WAVELENGTH-CONVERTING LAYER

(71) Applicant: KING ABDULLAH UNIVERSITY OF SCIENCE AND TECHNOLOGY, Thuwal (SA)

(72) Inventors: Boon S. Ooi, Thuwal (SA); Chun Hong Kang, Thuwal (SA); Tien Khee Ng, Thuwal (SA); Osman M. Bakr, Thuwal (SA); Ibrahim Dursun, Thuwal (SA); Lutfan Sinatra, Thuwal (SA); Marat Lutfullin, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/413,700

(22) PCT Filed: Nov. 26, 2019

(86) PCT No.: PCT/IB2019/060181
§ 371 (c)(1),
(2) Date: Jun. 14, 2021

(87) PCT Pub. No.: WO2020/128686
PCT Pub. Date: Jun. 25, 2020

(65) Prior Publication Data
US 2022/0021465 A1 Jan. 20, 2022

Related U.S. Application Data

(60) Provisional application No. 62/780,580, filed on Dec. 17, 2018.

(51) Int. Cl.
*H04B 10/00* (2013.01)
*H04B 10/69* (2013.01)
(Continued)

(52) U.S. Cl.
CPC ............ *H04B 10/691* (2013.01); *C09K 11/66* (2013.01); *H04B 10/116* (2013.01); *H04B 10/675* (2013.01)

(58) Field of Classification Search
CPC ..... H04B 10/116; H04B 10/11; H04B 10/112; H04B 10/114; H04B 10/691;
(Continued)

(56) References Cited

U.S. PATENT DOCUMENTS 4,065,672 A * 12/1977 Harpster ............... G01J 1/46
250/372
6,335,529 B1 * 1/2002 Sekii .................. G01J 1/58
250/372

(Continued)

FOREIGN PATENT DOCUMENTS

| WO | 2014049355 A1 | 4/2014 |
| WO | 2017134437 A1 | 8/2017 |
| WO | 2017195062 A1 | 11/2017 |

OTHER PUBLICATIONS

Dong, Y., et al., "Nanopatterned Luminescent Concentrators for Visible Light communications," Optics Express, Aug. 31, 2017, vol. 25, No. 18, pp. 21926-21934.
(Continued)

*Primary Examiner* — Hanh Phan
(74) *Attorney, Agent, or Firm* — Builders PLLC

(57) ABSTRACT

A high-speed, wavelength-converting receiver that includes a housing; a high-speed, wavelength-converting layer attached to the housing and configured to absorb a first light having a first wavelength range and emit a second light having a second wavelength range, which is different from the first wavelength range; and a high-speed photodetector attached to the housing and having an active face configured to absorb the second light having the second wavelength
(Continued)

range and generate an electrical signal. The active face of the photodetector is fully placed within the housing.

21 Claims, 21 Drawing Sheets

(51) Int. Cl.
*C09K 11/66* (2006.01)
*H04B 10/116* (2013.01)
*H04B 10/67* (2013.01)

(58) Field of Classification Search
CPC .... H04B 10/675; H04B 10/40; C09K 11/025; C09K 11/665; C09K 11/66
USPC ....... 398/182, 118, 119, 127, 128, 130, 135, 398/136, 158, 159, 202, 208, 210, 212, 398/172, 183; 250/372, 290, 373, 292, 250/432
See application file for complete search history.

(56) References Cited

U.S. PATENT DOCUMENTS

| | | | |
|---|---|---|---|
| 6,340,824 B1 | 1/2002 | Komoto et al. | |
| 6,713,795 B2* | 3/2004 | Kuhlmann | G01J 1/429 250/370.11 |
| 10,711,952 B2* | 7/2020 | Dursun | C09K 11/665 |
| 2002/0096728 A1 | 7/2002 | Kuhlmann | |
| 2015/0244457 A1* | 8/2015 | O'Brien | G06F 1/1601 398/118 |
| 2019/0148602 A1* | 5/2019 | Mu | F21K 9/20 362/362 |
| 2020/0082693 A1* | 3/2020 | Uedaira | G01J 1/0219 |

OTHER PUBLICATIONS

International Search Report in corresponding/related International Application No. PCT/IB2019/060181, dated Feb. 24, 2020.

Levell, J.W., et al., "A Hybrid Organic Semiconductor/Silicon Photodiode for Efficient Ultraviolet Photodetection," Optics Express, Feb. 1, 2010, vol. 18, No. 4, pp. 3219-3225.

Written Opinion of the International Searching Authority in corresponding/related International Application No. PCT/B2019/060181, dated Feb. 24, 2020.

Zhang, M., et al., "Perovskite Quantum Dots Embedded Composite Films Enhancing UV Response of Silicon Photodetectors for Broadband and Solar-Blind Light Detection," Advanced Optical Materials, May 31, 2018, vol. 6, pp. 1800077 (7 pages), WILEY-VCH Verlag GmbH & Co. KGaA, Weinheim.

* cited by examiner

| Material | PLQY | 3-dB Bandwidth | Transmitter | Data Rate | Application module |
|---|---|---|---|---|---|
| $CsPbBr_3$ | ~70% (solution) | 491 MHz | 450 nm LD | 2 Gbps | Transmitter |
| BBEHP-PPV | ≥75% (thin film) | ≥200 MHz | 450 nm LD | 350 Mbps | Transmitter |
| RhB@Al-DBA | 12% (thin film) | 3.6 MHz | 395 nm LED | 3.6 Mbps | Transmitter |
| Carbon dots | 21% (solution) | 285 MHz | 450 nm LD | 350 Mbps | Transmitter |
| $CsPbBr_{1.8}I_{1.2}$ | 78% (solution) | 73 MHz | 445 nm LED | 190 Mbps | Transmitter |
| CdTe QD | 69% (thin film) | 42 MHz | - | - | Transmitter |
| CPC-LSC | 60% (thin film) | - | blue LED | 400 Mbps | Receiver |
| $CsPbBr_3$ | 72.95% (thin film) | 70.92 MHz | 278 nm LED | 34 Mbps | Receiver (UVC) |

FIG. 12

ULTRAVIOLET DETECTION WITH HIGH-SPEED WAVELENGTH-CONVERTING LAYER

CROSS-REFERENCE TO RELATED APPLICATIONS

This application is a U.S. National Stage Application of International Application No. PCT/IB2019/060181, filed on Nov. 26, 2019, which claims priority to U.S. Provisional Patent Application No. 62/780,580, filed on Dec. 17, 2018, entitled "UV DETECTION WITH HIGH-SPEED WAVELENGTH-CONVERTING PEROVSKITE-BASED LAYER," the disclosures of which are incorporated herein by reference in #s their entirety.

BACKGROUND

Technical Field

Embodiments of the subject matter disclosed herein generally relate to a system and method for detecting ultraviolet (UV) light, and more particularly, to a system and method enhancing UV responsivity and simultaneously offering UV high-detection speed for a photodetector.

Discussion of the Background

Optical wireless communication (OWC), including visible light communication (VLC), which ranges from 380 nm to 800 nm, and ultraviolet (UV)-based communication, which ranges from 200 to 380 nm, has attracted considerable attention because OWC may play an important role for the fifth-generation (5G) wireless communication and beyond, which requires higher bandwidth and lower latency. Compared to the existing regulated radio-frequency (RF) communication, the OWC offers an unlicensed and secured bandwidth, spanning UV to visible wavelengths of up to hundreds of THz to mitigate the congested bandwidth in the RF network. For the VLC, high data rates on the order of gigabits per second (Gbps) have been widely demonstrated using different modulation schemes in the line-of-sight (LOS) configuration. However, this configuration by itself is inadequate for a complete communication system.

Mimicking the indirect RF signal transmission pathway is pivotal in offering a robust solution for OWC. Fortunately, a system 100 that uses light 102 in the UV wavelength region is highly scattered due to various obstacles 107, through both Rayleigh and Mie scattering 106, as illustrated in FIG. 1, thus constituting the much-required non-line-of-sight (NLOS) communication pathway, between the UV light source 104 and the UV light receiver 108. This pathway will relieve the strict requirements on pointing, acquisition, and tracking (PAT) in the LOS communication. Furthermore, UV-based communication is highly appealing compared to the VLC owing to its low background solar radiation, particularly in the solar-blind UVC region 121 (100-280 nm) due to the strong absorption by the ozone layer 122. Note that that UV light is split into UVA (315-400 nm), UVB (280-315 nm) and UVC (100-280 nm). FIG. 1 shows the UV light 120 being emitted by the sun and the UVC light 121 being absorbed by the ozone layer 122 while the UVA and UVB light 124 is transmitted through the ozone layer. Low noise-floor free-space communication in the UVC spectrum will also enable a wide variety of applications, such as missile detection and aircraft landing in low visibility conditions.

A reliable UV-based communication link, specifically in the UVC region, will create new frontiers for optical wireless communication systems, empowering the internet of things (IoT) and internet of underwater things (IoUT). Despite the importance of a UV-based communication link, the limitations of the transmitter and receiver technologies impede the current advancement of this technology. For the receiver end, high-performance photodiodes or multi-pixel detectors across the UV-to-visible region are required for various practical applications.

In the OWC field, the bulky photomultiplier tube (PMT) is still being used owing to its large spectral range and high signal-to-noise (SNR) ratio. However, the PMT suffers from a high-power consumption, a bulky form factor, and a high cost. In contrast, compact and small-footprint group-III-nitride-based photodetectors (PDs), e.g., AlGaN-, AlN-, and BN-based PDs, suffer from costly materials and substrate development. The existence of defect states and crystal dislocations related to high dark current complicates the design process and delays the further deployment of these PDs for UV-based communication systems.

On the other hand, low-cost and technologically mature silicon (Si)-based PDs are widely and commercially available. Nevertheless, owing to the low penetration depth of the high-energy UV photons in the silicon layer (e.g., less than 20 nm for the deep UV to UVA region), the responsivity of the existing Si-based PDs is less than 0.1 NW for wavelengths below 400 nm. For practical communication in the UVC-to-UVA band, this low-responsivity will degrade the SNR of the communication link, which is undesired.

Recent efforts to circumvent the abovementioned issues are now discussed, although it is noted that these techniques are not suitable for high-speed optical wireless communication. A conjugated polymer thin-film was first used as a luminescent material for enhancing the UV responsivity of Si-based PDs [1]. This approach explores the use of luminescent thin films to absorb high-energy UV photons that are re-emitted in the visible wavelength region, in which Si-based PDs exhibit a higher responsivity. Another down-converting luminescent material based on yttrium-vanadate-phosphate-borate:Eu $(Y(V,PO_4)_{0.9}(BO_3)_{0.1}:Eu)$ integrated with Si-based PDs was also demonstrated in a previous study [2]. However, both luminescent materials are known to have a long decay time of up to the order of milliseconds, and are thus, not suitable for high-speed modulation. The high-speed modulation is defined herein as being exhibited by a material that is capable of responding to a change in light intensity with a speed in the range of mega- to gigabits per second. A nanopatterned luminescent solar concentrator (LSC) for VLC was also investigated in [3]. However, the SuperYellow fluorescent emitter in [3] exhibits reduced absorption in the UV region, which limits its operation to only the visible wavelength region. Another approach discussed in [4] demonstrated the integration of MaPbBr3-based perovskite quantum dots with an electron multiplying charge coupled device (EMCCD)-based image sensor. However, none of the present approaches has achieved a high-speed, down-converting photodetector that is appropriate for OWC.

Thus, there is a need for a new approach that offers high-speed UV light communication that is compatible with existing photodetectors.

BRIEF SUMMARY OF THE INVENTION

According to an embodiment, there is a high-speed, wavelength-converting receiver that includes a housing, a high-speed, wavelength-converting layer attached to the housing and configured to absorb a first light having a first wavelength range and emit a second light having a second wavelength range, which is different from the first wavelength range, and a high-speed photodetector attached to the housing and having an active face configured to absorb the second light having the second wavelength range and generate an electrical signal. The active face of the photodetector is fully placed within the housing.

According to another embodiment, there is a high-speed, wavelength-converting receiver which includes a housing having a spherical interior chamber, the spherical interior chamber having an inlet port for receiving a first light having a first wavelength range, and having an outlet port for releasing a second light having a second wavelength range, which is different from the first wavelength range, a high-speed, wavelength-converting layer located inside the spherical interior chamber and configured to absorb the first light and emit the second light, and a high-speed photodetector located at the outlet port and having an active face configured to absorb the second light having the second wavelength range and generate an electrical signal. A material of the high-speed, wavelength-converting layer is configured to respond to a change in a light intensity with a speed of at least megabits per second.

According to yet another embodiment, there is a method for transmitting information using ultraviolet (UV) light and the method includes emitting first UV light that encodes the information; receiving, at a high-speed, wavelength-converting layer, the first UV light; re-emitting, with the high-speed, wavelength-converting layer, a second light having a wavelength different from the first UV light; transforming, with a high-speed photodetector, the second light into an electrical signal that preserves the encoded information; and decoding, with a processing unit, the encoded information from the electrical signal. A material of the high-speed, wavelength-converting layer is configured to respond to a change in a light intensity with a speed of at least megabits per second.

BRIEF DESCRIPTION OF THE DRAWINGS

For a more complete understanding of the present invention, reference is now made to the following descriptions taken in conjunction with the accompanying drawings, in which:

FIG. 12 is a table that illustrates a comparison of phosphor-based devices for optical wireless communication and the receiver presented in the previous figures;

DETAILED DESCRIPTION OF THE INVENTION

Figure 1:
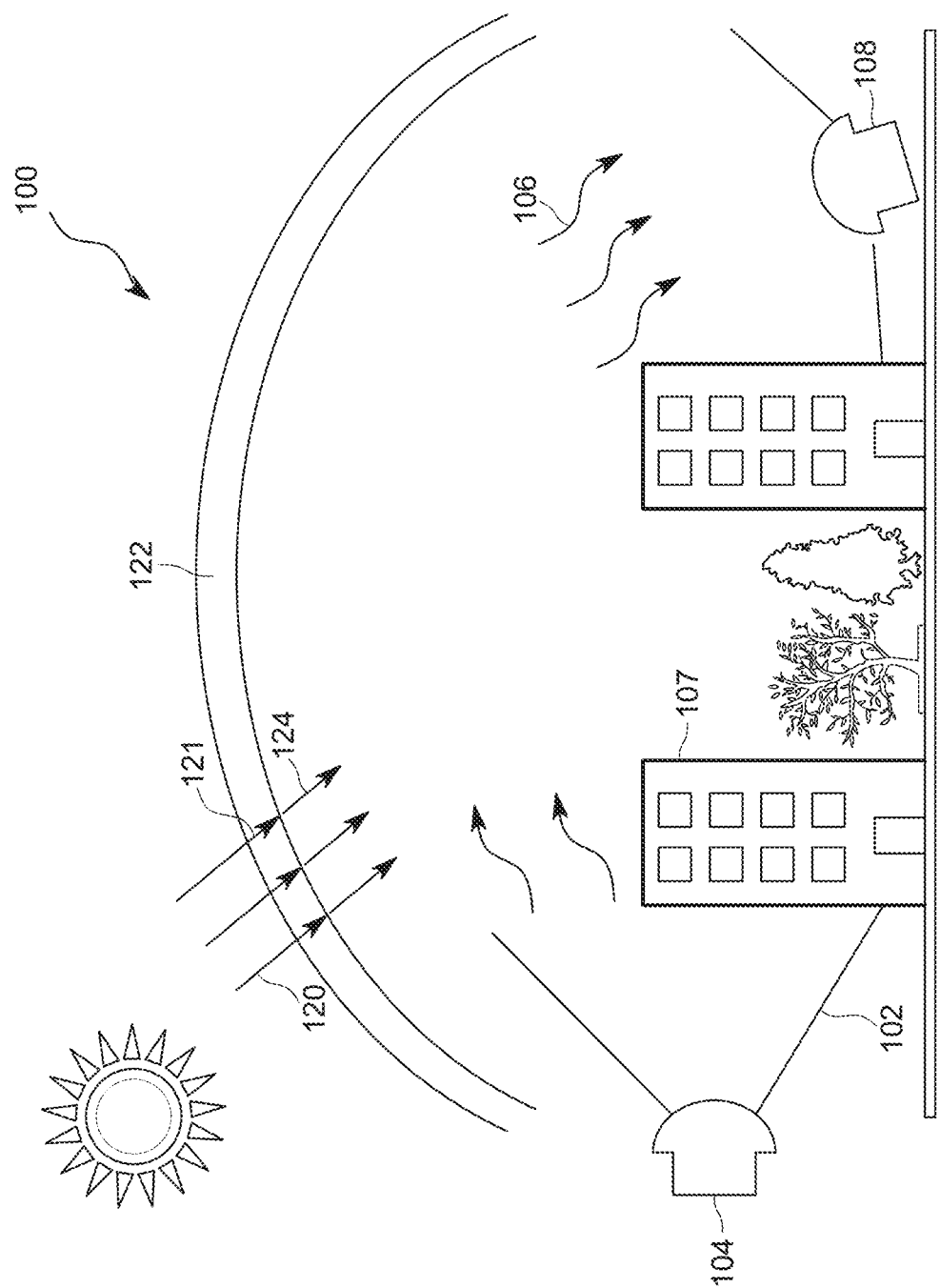
FIG. 1 illustrates a communication system that uses UV light in the presence of obstacles.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a system that uses a high-speed, color-converting, photodetector with an inorganic based perovskite nanocrystals for UV communication.

However, the embodiments to be discussed next are not limited to inorganic materials, but they may be used with organic materials that wavelength-convert incoming UV light into visible light and supply the visible light to a Si-based photodetector or other conventional photodetector.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a hybrid Si-based photodetection device incorporates $CsPbBr_3$ perovskite nanocrystals (NCs) with a high photoluminescence quantum yield (PLQY) and a fast photoluminescence (PL) decay time as a UV-to-visible colour-converting layer for high-speed solar-blind UV communication. The facile formation of drop-cast $CsPbBr_3$ perovskite NCs leads to a high PLQY of up to ~73% and strong absorption in the UV region. With the addition of the NC layer, a nearly three-fold improvement in the responsivity and an increase of about 25% in the external quantum efficiency (EQE) of the solar-blind region compared to a commercial silicon-based photodetector were observed. Moreover, time-resolved photoluminescence measurements demonstrated a decay time of 4.5 ns under a 372-nm UV excitation source, thus indicating the potential of this layer as a fast colour-converting layer. A significantly high-data rate of up to 34 Mbps in solar-blind communication was achieved using the hybrid $CsPbBr_3$-silicon colour-converting photodetection scheme in conjunction with a 278-nm solar-blind UVC light-emitting diode (LED). These experiments demonstrate the feasibility of an integrated high-speed photoreceiver design of a composition-tuneable perovskite-based phosphor and a low-cost silicon-based photodetector for UV communication.

In contrast to other down-converting luminescent materials, all-inorganic lead halide perovskites ($CsPbX_3$, where X=Cl, Br, and I) have emerged as a new class of materials for optoelectronic applications owing to their facile solution-processable synthesis, controllable visible emission spectrum, high photoluminescence quantum yield, and low optical gain threshold. Moreover, recent approaches using a novel passivation technique and a Fabry Perot (FP) microcavity on lead halide perovskite have also been shown to induce ultra-stable amplified spontaneous emission (ASE) and even lasing characteristics. Such advancements are essential for realizing high-performance optical devices, such as up-conversion lasers and high-resolution optical microscopes. $CsPbBr_3$ nanocrystals (NCs) have highly air-stable characteristics compared with other organic halide perovskites, e.g., chloride- and iodide-based perovskite NCs. In addition, $CsPbBr_3$ NCs have a high absorption coefficient as well as a suitable bandgap for light detection and were recently demonstrated for use in a low-dose X-ray scintillator.

The inventors have observed that not only inorganic perovskite materials may be used as high-speed, wavelength-converting materials, but also some organic materials. Thus, an embodiment can include a high-speed, inorganic and/or organic, frequency down-converting layer with a lifetime of less than 50 ns. Examples of organic-based, frequency down-converting layers are as follows: BEH-PPV (poly[2,5-bis(2'-ethylhexyloxy)-1,4-phenylene vinylene]) having a lifetime of about 180 ps and PTB7 (Poly[[4,8-bis[(2-ethylhexyl)oxy]benzo[1,2-b:4,5-b]dithiophene-2,6-diyl][3-fluoro-2-[(2-ethylhexyl)carbonyl]thieno[3,4-b]thiophenediyl]]) having a lifetime of about 35 ps. The SY-PPV (SuperYellow copolymer), having a lifetime of about 1.9 ns, may also be used with other light wavelengths. In one application, the high-speed, wavelength-converting layer can include organometallic or inorganic halide perovskite having the formula $ABX_3$ (where A is selected from $Cs^+$, $Rb^+$, $CH_3NH_3^+$, and $HC(NH_2)_2^+$, B is selected from $Pb^{2+}$, $Sn^{2+}$, $Ge^{2+}$, $Mg^{2+}$, $Ca^{2+}$, $Sr^{2+}$, $Ba^{2+}$, $Cu^{2+}$, $Fe^{2+}$, $Pd^{2+}$, and $Eu^{2+}$, and X is a halogen $Cl^-$, $Br^-$ or $I^-$) and lifetime of 1-50 ns. In still another application, the organometallic halide perovskite can have a thickness of about 100 to 1,000 micron. In this embodiment, the length and width of the high-speed, wavelength-converting layer can be designed based on a particular usage, from micron scale to centimeter scale or even higher.

According to an embodiment, a novel receiver for a UVC communication link is presented and this receiver uses a hybrid $CsPbBr_3$-silicon colour-converting photodetection scheme, where the $CsPbBr_3$ layer converts the UV light into visible light and the silicon (Si-based PD) converts the visible light from the $CsPbBr_3$ layer into an electrical signal. The responsivity and external quantum efficiency (EQE) of the Si-based PDs in the green spectrum region are significantly higher than those in the UV region. The high-PLQY drop-cast $CsPbBr_3$ perovskite NC layer on a UV quartz substrate can effectively down-convert the incident UV light into the green wavelength region to realize an enhanced photodetection performance in the UV region. The measured small-signal modulation bandwidth of this hybrid photodetector confirms the feasibility of high-frequency modulation. Correspondingly, a high-speed solar-blind UVC communication link was demonstrated using a 278-nm solar-blind UVC LED as a transmitter and the hybrid $CsPbBr_3$-silicon colour converter as a receiver. This configuration demonstrates the feasibility of using a high-PLQY and high-speed $CsPbBr_3$ perovskite NC layer as a colour-converting luminescent material in a mature silicon-foundry-based photodetector platform for high-sensitivity and high-speed UV-based communication.

Figure 2:
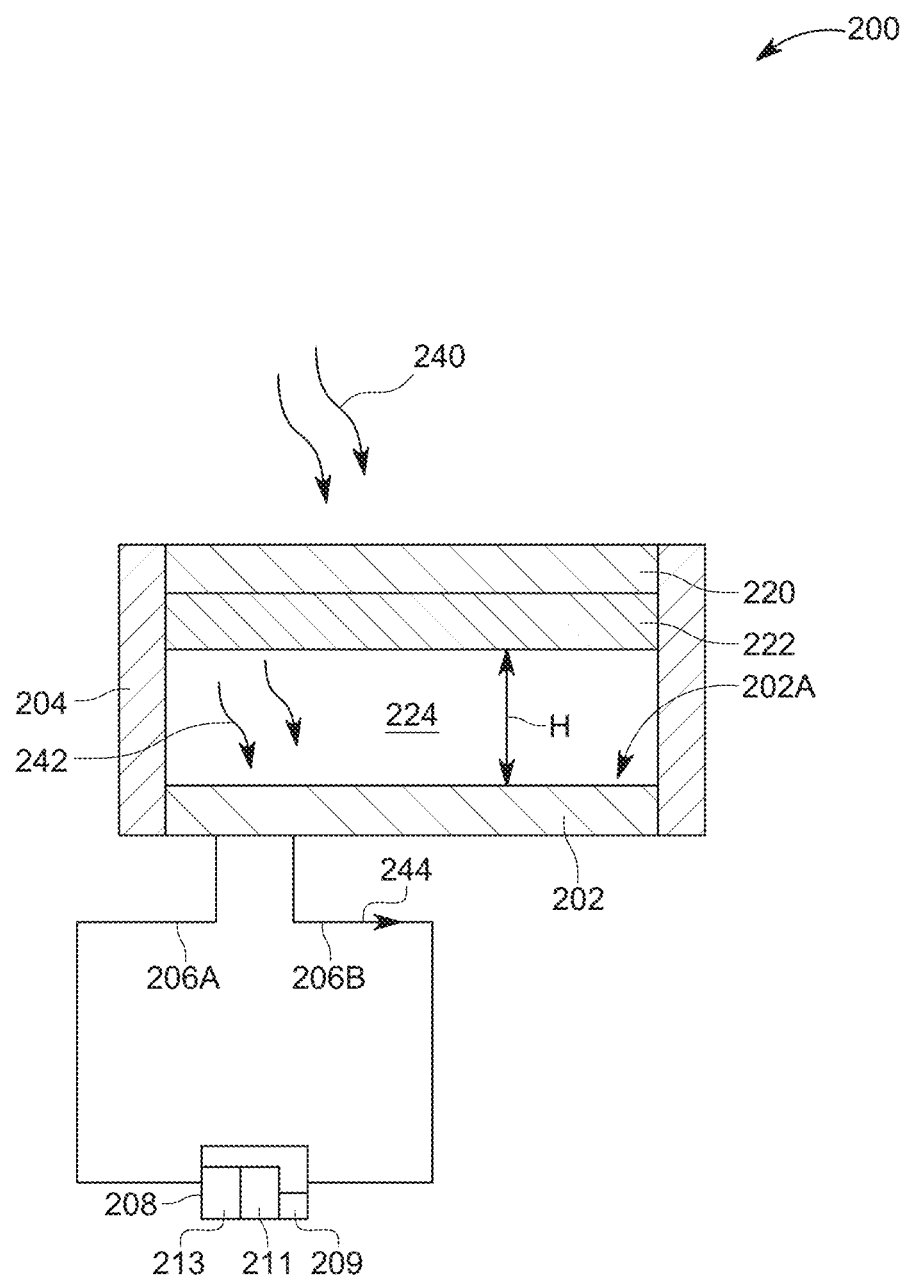
FIG. 2 illustrates a receiver that uses a high-speed, wavelength-converting layer for converting incoming light having a first wavelength into an outgoing light having a second wavelength, which is different from the first wavelength.

The novel receiver is now discussed with regard to FIG. 2. FIG. 2 shows the receiver 200 having a Si-based photodetector (PD) 202 provided within a housing 204 and a high-speed, wavelength-converting layer 220 formed on a transparent substrate 222, also located within the housing 204. The PD 202 has an active face 202A that is configured to absorb visible light and transform it into an electrical signal. In one embodiment, the PD 202 is arranged relative to the housing 204 so that the active face 202A is fully located within a chamber 224, which is discussed later. Two leads 206A and 206B are shown being electrically connected to the photodetector 202 and they are configured to take the electrical current generated by the light conversion to a processing unit 208. The processing unit 208 may include a processor 209, a memory 211 and a power source 213, for example, a battery.

The chamber 224 formed by the transparent substrate 222, the PD 202, and the walls of the housing 204 has a height H between 0 and 1 mm. If the height H of the chamber 224 is different than zero, the chamber is configured to hold a gas, for example, nitrogen, or to be under vacuum conditions. This means that the chamber is sealed from the environment of the receiver 200 after being filled with nitrogen or another gas or after being emptied of any gas.

The PD 202 may be any known Si-based photodetector that is high-speed, or a Si-based avalanche photodetectors (APD), or other group-III-nitride-based photodetector. The high-speed, wavelength-converting layer 220 is in this embodiment a $CsPbBr_3$ perovskite nanocrystals layer, where the nanocrystals have an emission at about 506 nm wavelength with 20 nm of full-width at half-maximum as well as high photoluminescence quantum yield (PLQY). The PLQY in solution and film forms are ~100% and ~72%, respectively. However, as discussed above, other inorganic or organic materials may be used for the high-speed, wavelength-converting layer 220. Herein, for simplicity, it is assumed that the high-speed, wavelength-converting layer 220 includes $CsPbBr_3$ perovskite nanocrystals.

The high-speed, wavelength-converting layer 220 is formed on a highly UV transparent substrate, for example, amorphous glass, quartz, or fused silica. The housing 204 may be formed from any material that is opaque to light in the visible and UV spectrum as it is not desired to receive or leak out any light through the walls of the housing.

For this embodiment, a first light 240 having a first wavelength range (UV range in this embodiment) is absorbed by the high-speed, wavelength-converting layer 220 and down-converted (in terms of frequency) and re-emitted as a second light 242, having a second wavelength range (in the visible wavelength range in this example), inside the chamber 224. The visible light 242 is then absorbed by the high-speed PD 202 and transformed into an electrical signal 244, which is transmitted to processing unit 208, along leads 206A and 206B. In the embodiment, a highly reflective lens in the visible wavelength region could be added.

Figure 3:
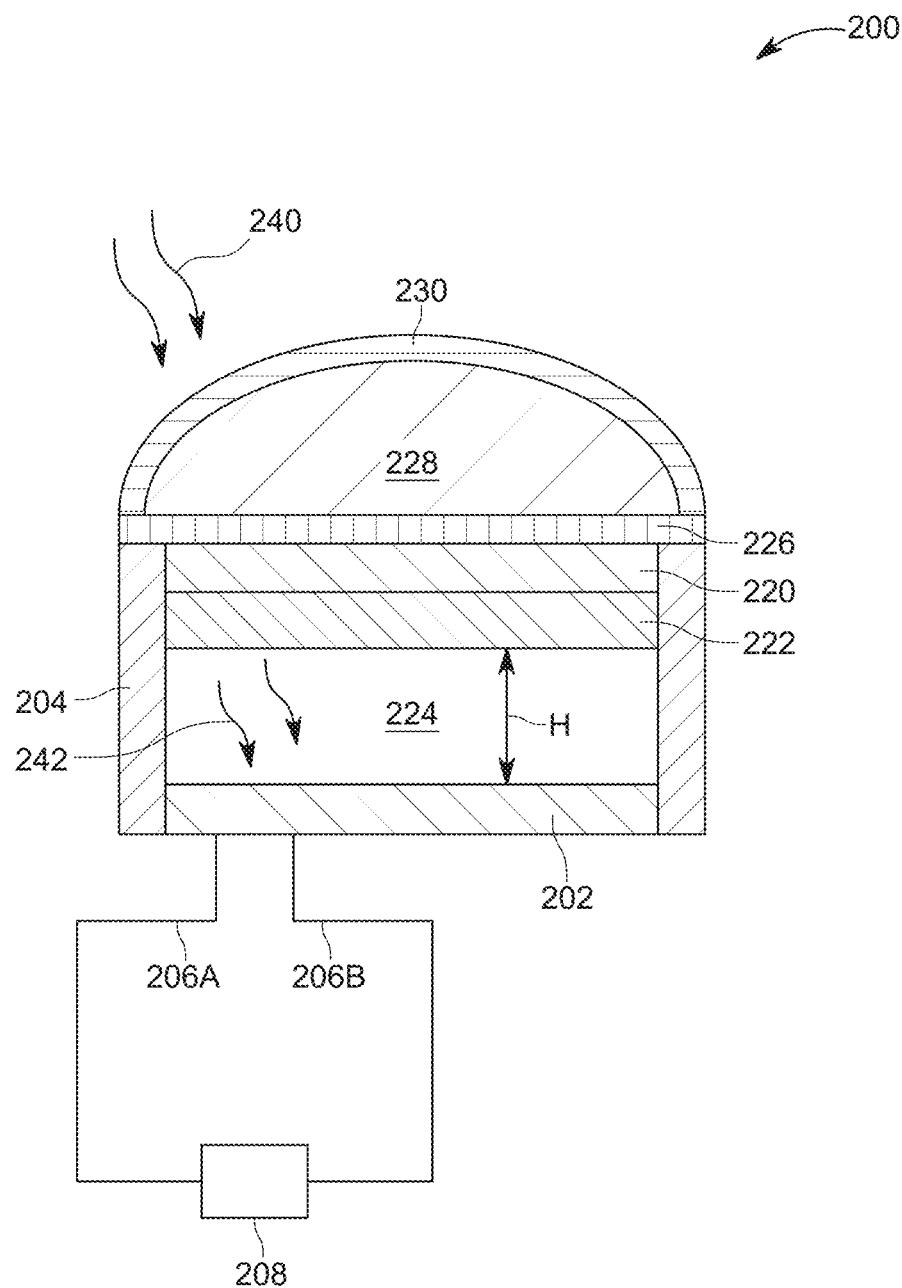
FIG. 3 illustrates another receiver that uses a high-speed, wavelength-converting layer for converting incoming light having a first wavelength into an outgoing light having a second wavelength, which is different from the first wavelength.

To improve the efficiency of this arrangement, in one embodiment, as illustrated in FIG. 3, a highly-reflective optical element 226 is placed over the high-speed, wavelength-converting layer 220, for filtering out the visible light and allowing mostly UV light to pass. The highly-reflective optical element 226 is, in one application, a dichroic filter (manufactured by Rocky Mountain Instrument Co., CO, USA) that could be custom-designed in order to allow transmission of ≥90% in the UV region and reflection of ≥99% in the visible wavelength region.

In the embodiment illustrated in FIG. 3, a UV-transparent microlens 228 could also be added to focus the incoming light 240 onto the high-speed photodetector 202. The UV-transparent microlens 228 may be located directly on top of the highly-reflective optical element 226. In one application, a coated-noise filter 230 could be added to the microlens 228 to enhance the signal-to-noise ratio, depending on the required detection wavelength. The coated-noise filter 230 may be selected to include a short pass, long pass, edge pass and/or band pass filter. The coated-noise filter 230 may be placed anywhere on the UV-transparent microlens 228.

Figure 4:
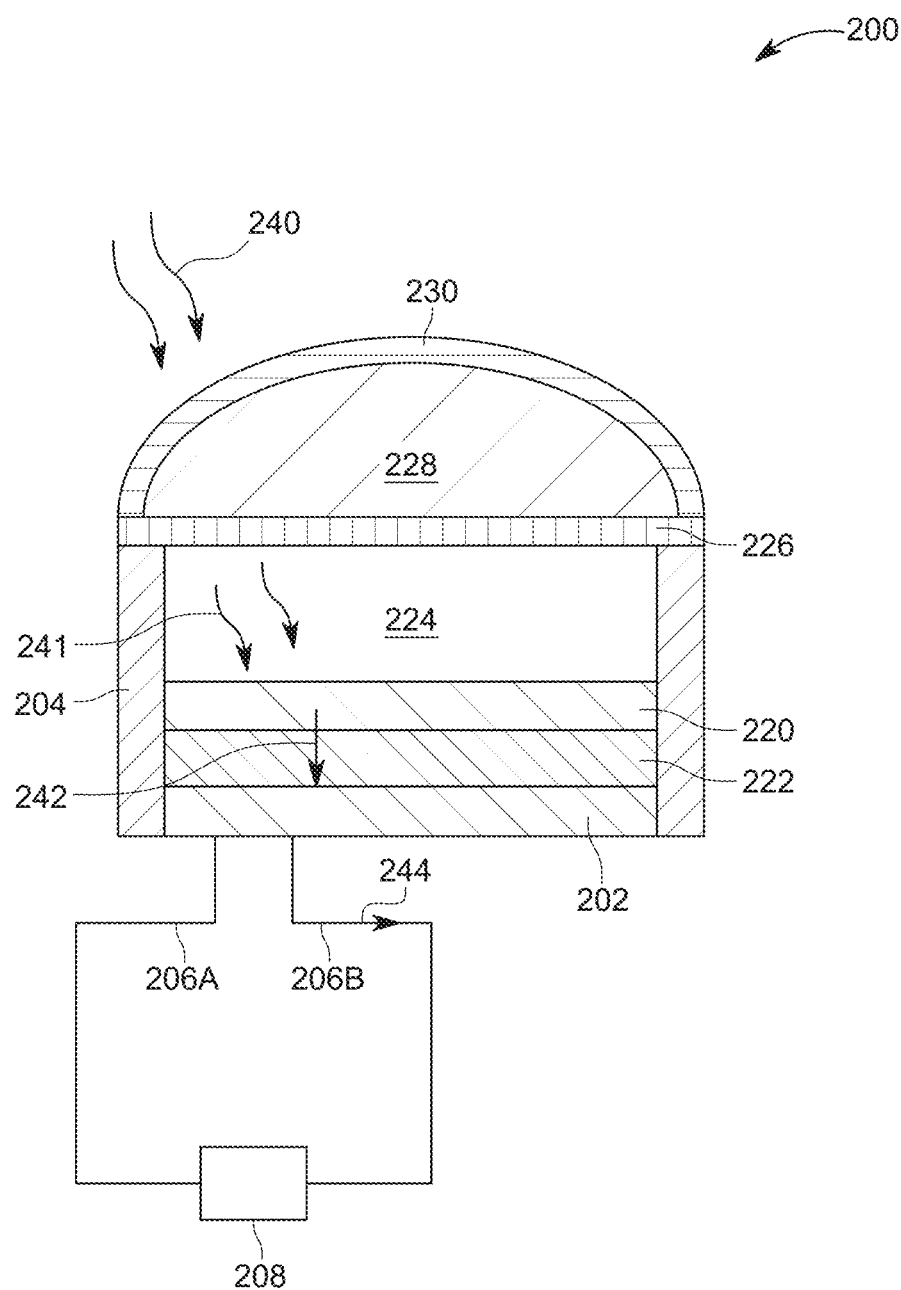
FIG. 4 illustrates still another receiver that uses a high-speed, wavelength-converting layer for converting incoming light having a first wavelength into an outgoing light having a second wavelength, which is different from the first wavelength.

The embodiment illustrated in FIG. 3 can be modified as now discussed. For example, the embodiment illustrated in FIG. 4 is similar to that of FIG. 3, except that the high-speed, wavelength-converting layer 220 and its transparent substrate 222 have been moved toward the PD 202 so that the transparent substrate 222 is in direct contact with the PD 202. This means that the chamber 224 is now defined by the high-speed, wavelength-converting layer 220, the walls of the housing 204, and the optical element 226. In this way, the incoming light 240 is filtered by the filter 230 and the optical element 226 to obtain a reach UV light 241. The reach UV light 241 is focused by the microlens 228 onto the high-speed, wavelength-converting layer 220, which generates visible light 242, which impinges on the PD 202 and generates the electrical signal 244.

Figure 5:
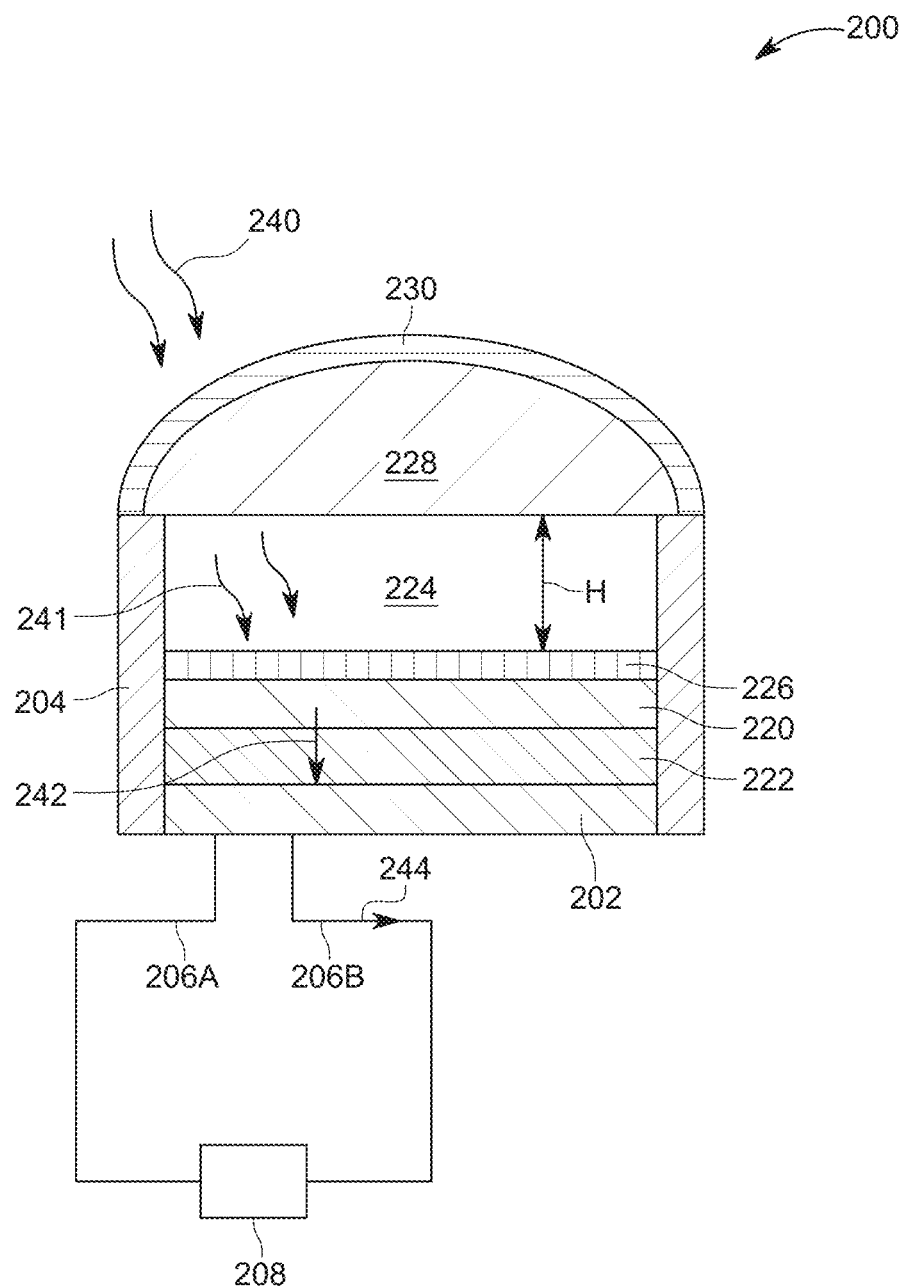
FIG. 5 illustrates yet another receiver that uses a high-speed, wavelength-converting layer for converting incoming light having a first wavelength into an outgoing light having a second wavelength, which is different from the first wavelength.

In still another embodiment, as illustrated in FIG. 5, the optical element 226 is moved to be in direct contact with the high-speed, wavelength-converting layer 220, and thus, the chamber 224 is now defined by the optical element 226, the walls of the housing 204, and the microlens 228. As previously discussed, the chamber 224 may have a height H between zero and 1 mm.

Figure 6A:
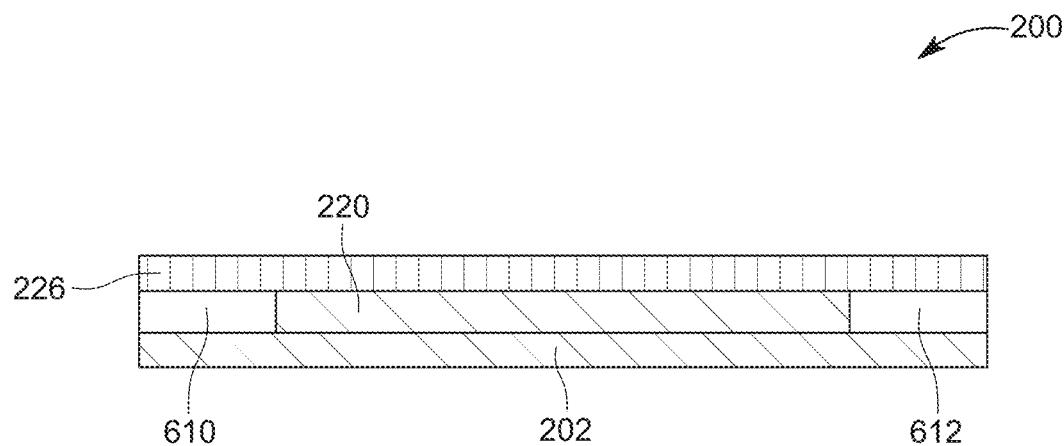
FIGS. 6A and 6B illustrate a receiver that uses a high-speed, wavelength-converting layer, which is sandwiched between cladding layers, for converting incoming light having a first wavelength into an outgoing light having a second wavelength, which is different from the first wavelength.
Figure 6B:
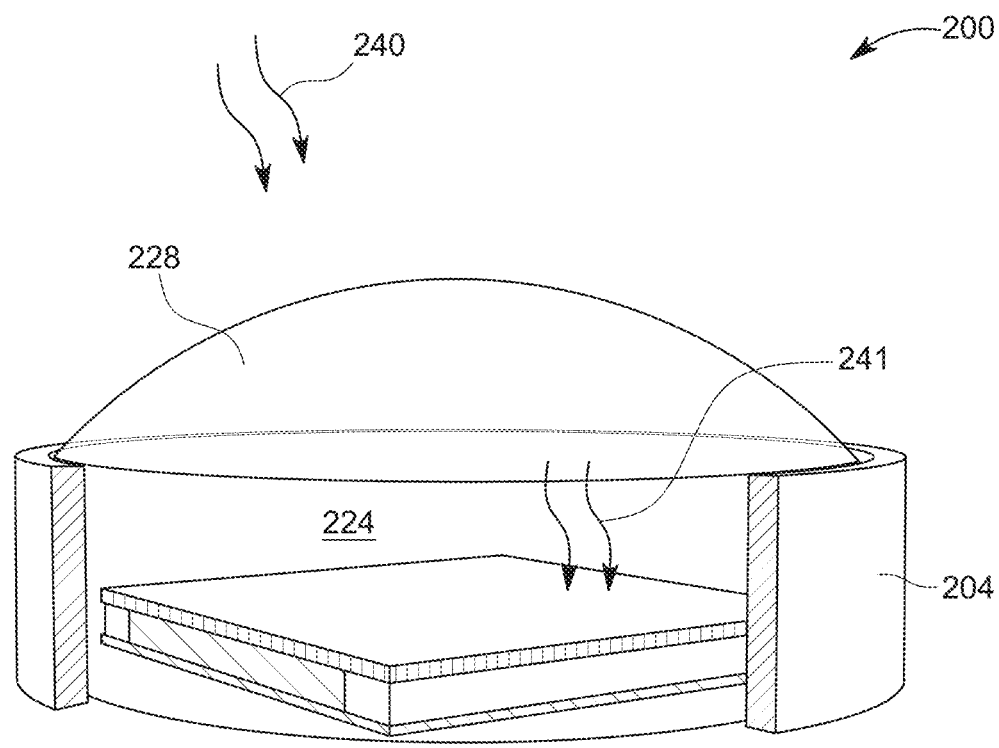

In still another embodiment, as illustrated in FIGS. 6A and 6B, the high-speed, wavelength-converting layer 220 is sandwiched between cladding layers 610 and 612 and integrated directly onto the high-speed photodetector 202, with no UV-transparent substrate. The optical element 226 is formed directly onto the high-speed, wavelength-converting layer 220. Although the embodiment of FIGS. 6A and 6B show the high-speed, wavelength-converting layer 220 formed directly on the PD 202, in one variation, it is possible to have the high-speed, wavelength-converting layer 220 formed first on the transparent layer 222 and the transparent layer to be directly attached to the PD 202.

With the cladding layers 610 and 612, the re-emitted visible light from the high-speed, wavelength-converting layer 220 can readily propagate, in a vertical zigzag fashion with total internal reflection (TIR) at the boundaries, onto the high-speed photodetector 202. The cladding layer having an index of refraction $n_2$ is required to have a lower refractive index, i.e. $n_2<n_1$, than that of the high-speed, wavelength-converting layer 220 (index of refraction $n_1$). A highly reflective microlens 228 in the visible wavelength region could be added as shown in FIG. 6B. The microlens 228 may be a dichroic filter that allows transmission of ≥90% in the UV region and reflection of ≥99% in the visible wavelength region.

Figure 7:
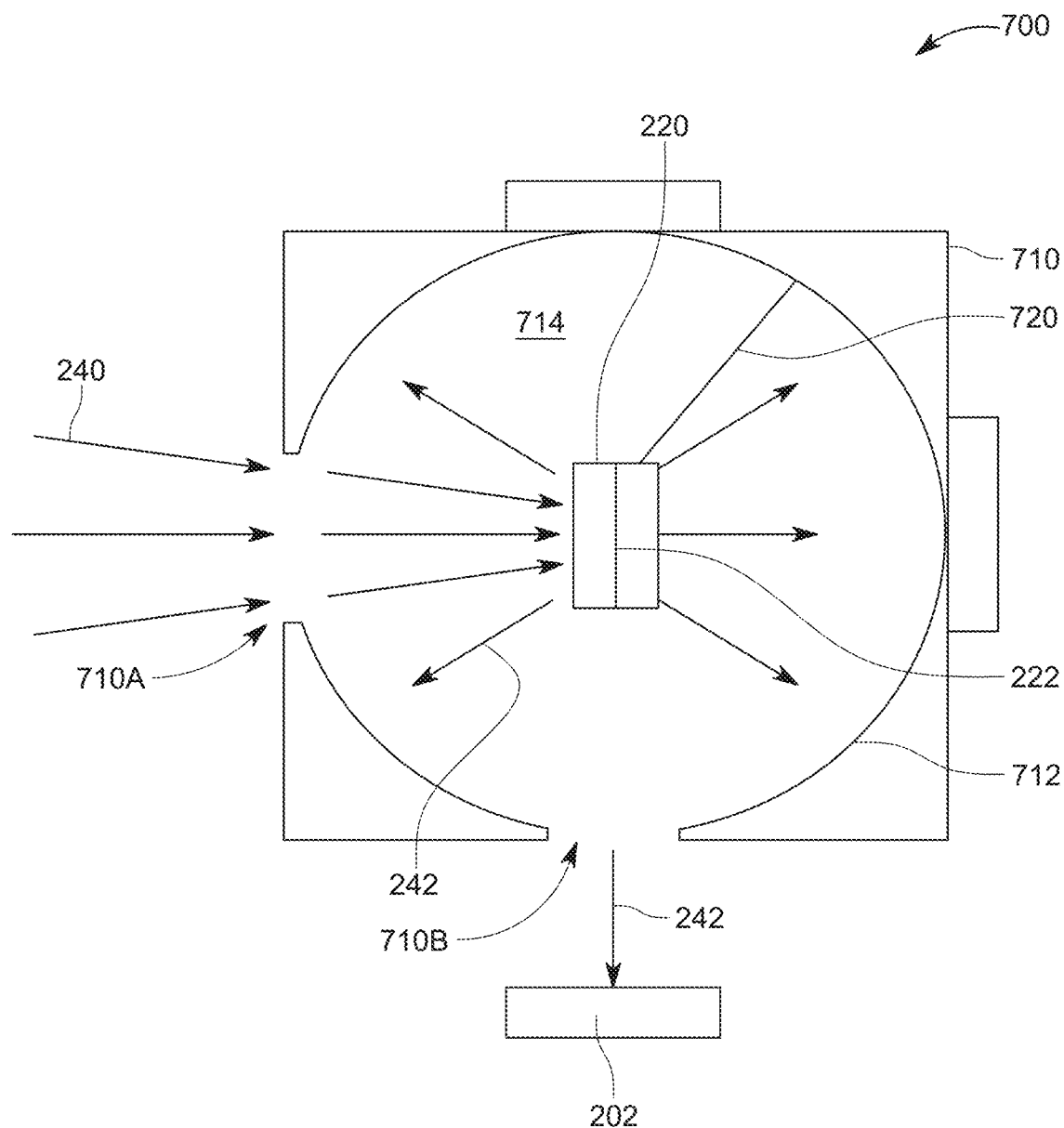
FIG. 7 illustrates a receiver that uses a high-speed, wavelength-converting layer, which is placed inside a spherical enclosure, for converting incoming light having a first wavelength into an outgoing light having a second wavelength, which is different from the first wavelength.

The high-speed, wavelength-converting layer 220 may be implemented into a micro-integrating sphere coupled to a high-speed photodetector as now discussed with regard to FIG. 7. The receiver 700 has a housing 710 that forms the micro-integrating sphere, which has an interior chamber 714. A shape of the interior chamber 714 is spherical, and it is defined by the internal surface 712 of the housing 710. The housing 710 has an inlet port 710A for receiving the UV light 240 and an outlet 710B for allowing the generated visible light 242 to exit the housing 710. In one embodiment, the housing 710 has a single inlet and a single outlet. In this way, most if not all the received UV light 240 is eventually transformed by the high-speed, wavelength-converting layer 220 into the visible light 242, and most if not all the visible light 242 is then collected by the PD 202, which is placed outside the interior chamber 714. The PD 202 is placed at the outlet 710B. Note that because of the spherical shape of the internal surface 712 of the housing 710, both the UV light and the visible light experience multiple reflections inside the chamber 714, until all or most of the UV light is transformed into the visible light and until all or most of the visible light is supplied to the PD 202. Thus, such a receiver has a very high converting rate of the UV light into the visible light and also a high collection rate of the visible light on the PD 202. The high-speed, wavelength-converting layer 220 is formed on its highly-transparent substrate 222 and it may be hung in the center of the spherical internal surface 712, for example, with a suspending rod 720. In one application, the internal surface 712 may have a high UV-reflective coating, for example, Polytetrafluoroethylene (PTFE). Other materials that have similar properties may be used.

Common for all the embodiments discussed above is that the chemical composition of the high-speed, wavelength-converting layer 220 may be selected to achieve a desired output visible wavelength, for example, between 400 and 800 nm. For example, if the $CsPbBr_3$ perovskite nanocrystals layer 220 discussed above is used, then the UV light is transformed into green light. However, depending on the chemical composition of the high-speed, wavelength-converting layer 220, it is possible to transform the UV light into blue or red light, or any other desired wavelength in the visible range.

Figure 8:
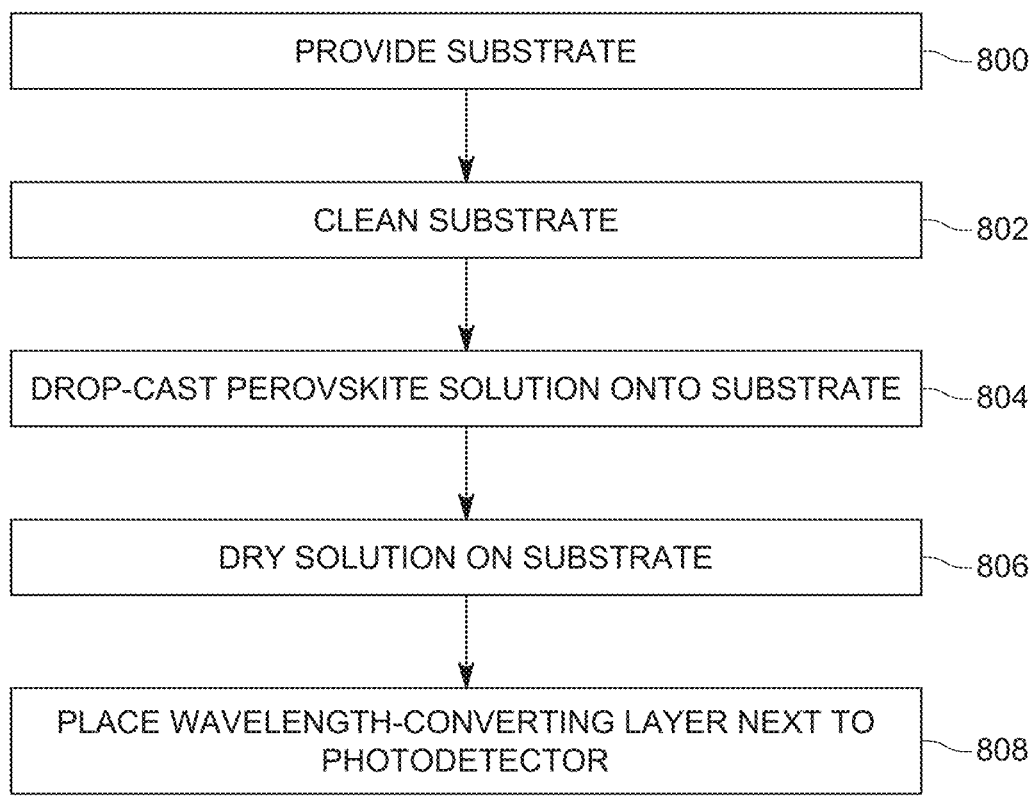
FIG. 8 is a flowchart of a method for making a receiver that uses a high-speed, wavelength-converting layer for converting incoming light having a first wavelength into an outgoing light having a second wavelength, which is different from the first wavelength.

A method for forming the high-speed, wavelength-converting layer 220 on the highly-transparent substrate 222 is now discussed with regard to FIG. 8. For this example, the high-speed, wavelength-converting layer 220 is considered to include $CsPbBr_3$ perovskite nanocrystals. The process starts in step 800 by providing the substrate 222. The substrate may be UV quartz. In step 802, the substrate is cleaned, in step 804 a $CsPbBr_3$ perovskite solution is drop-casted onto the substrate, and in step 806 the drop-casted perovskite solution onto the substrate is dried in air, for example, for 1 hour. Then, in step 808, the high-speed, wavelength-converting layer 220 and the highly-transparent substrate 222 are assembled with the PD 202 at the housing 204, to form the receiver 200.

Regarding step 804, the $CsPbBr_3$ QD solution is available commercially, for example, from Quantum Solutions LLC (www.quantum-solutions.com). The QDs have oleic acid and oleylamine as ligands on the surface and are dispersed in toluene, with a QD concentration of approximately 20 mg/mL. TEM was performed on a sample that was prepared by diluting the QD solution using toluene, which was drop-cast onto a formvar/carbon-coated 300 mesh copper TEM grid for analysis. The $CsPbBr_3$ NC layer was drop-cast onto a UV quartz substrate and dried to allow solvent evaporation for optical characterization.

Figure 9A:
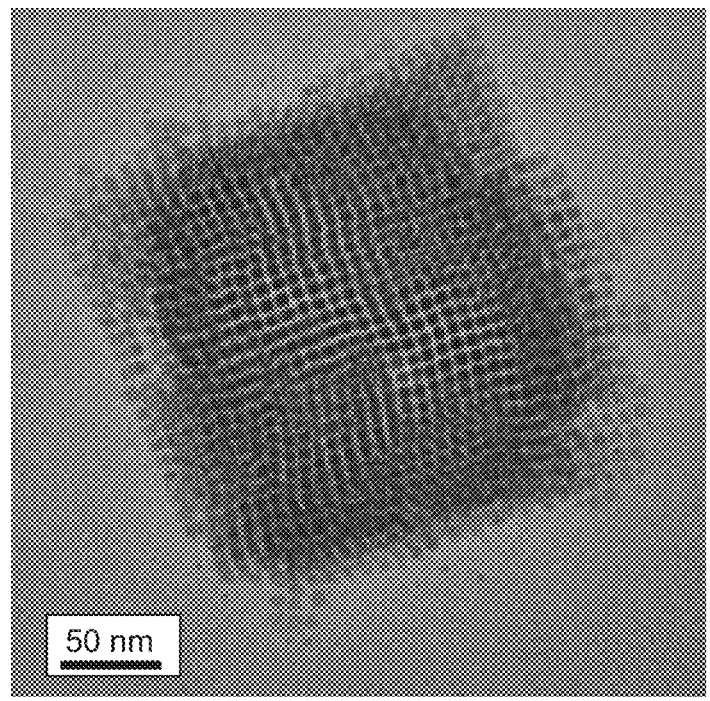
FIGS. 9A and 9B show transmission electron microscopy images of $CsPbBr_3$ perovskite nanocrystals that form the high-speed, wavelength-converting layer.
Figure 9B:
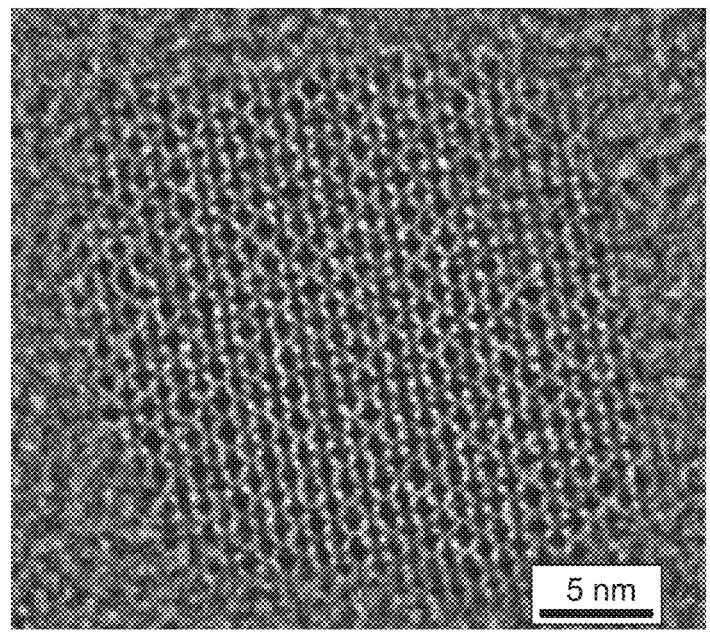
Figure 9C:
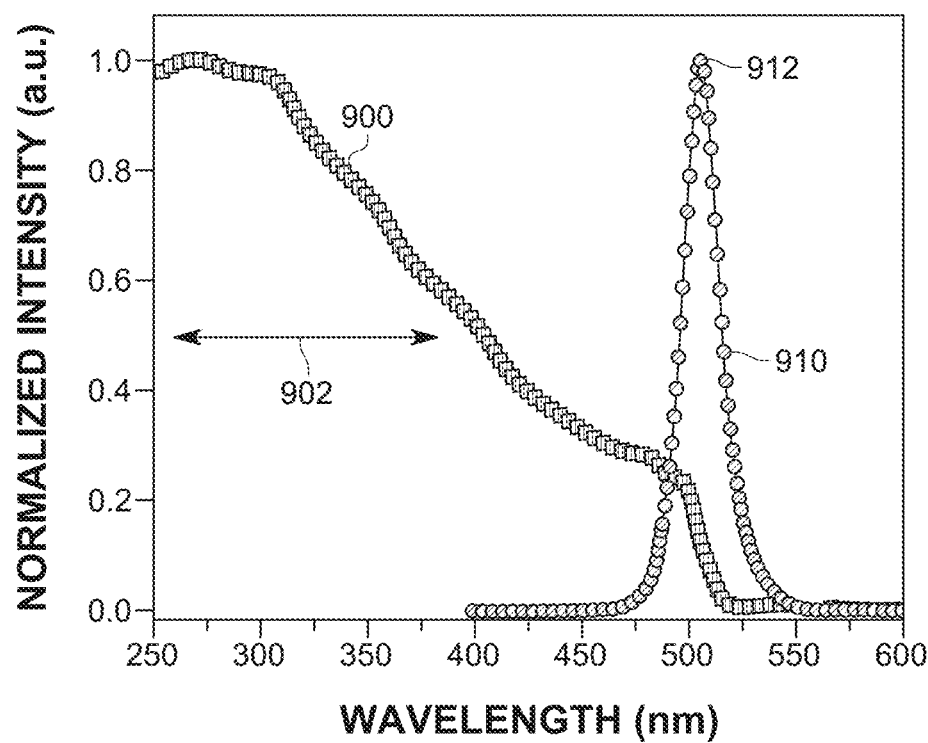
FIG. 9C shows the absorption and photoluminescence (PL) spectra of the $CsPbBr_3$ perovskite nanocrystals.
Figure 9D:
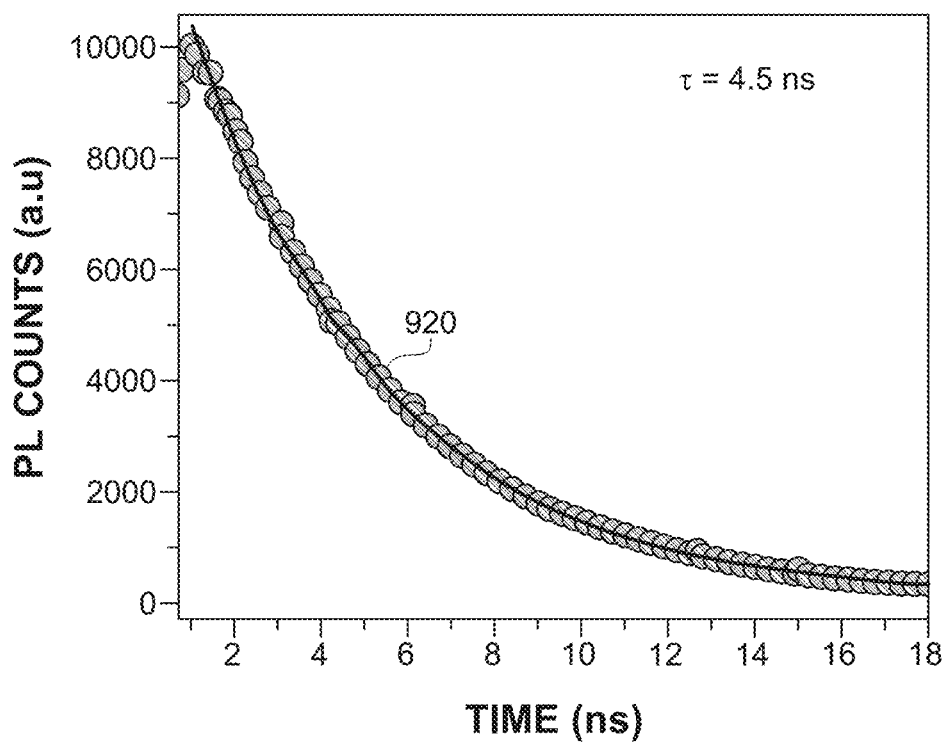
FIG. 9D shows the time-resolved PL decay trace monitored at a given wavelength following an 372 nm excitation of the high-speed, wavelength-converting layer.

FIGS. 9A and 9B show transmission electron microscopy (TEM) and high-resolution TEM (HR-TEM) images of the $CsPbBr_3$ perovskite NCs used for the receivers 200 and 700. The corresponding HR-TEM image shown in FIG. 9B reveals cubic NCs with an average size of approximately 6.39±0.6 nm. FIG. 9C shows the absorption 900 and photoluminescence (PL) 910 spectra of the $CsPbBr_3$ perovskite NCs. It is noted that the $CsPbBr_3$ perovskite NC layer 220 has a sharp PL emission 912 at approximately 506 nm, with a narrow full width at half maximum (FWHM) of 19 nm. At the same time, strong absorption in the UV region 902 is also observed. In addition, the radiative recombination time 920 between the photoexcited electron and hole of the $CsPbBr_3$ perovskite NC layer 220 was measured from the PL decay trace, which was monitored at 506 nm following a 372 nm excitation, as illustrated in FIG. 9D. The PL lifetime decay profile was collected at 506 nm. The decay curve 920 can be fitted with a single exponential function with a lifetime of approximately 4.5±0.1 ns, thus showing the potential of this layer as a high-speed luminescent material.

In addition, the inventors measured the PLQY of the $CsPbBr_3$ perovskite NCs dispersed in toluene and drop-cast onto a quartz substrate and found it to be near unity in the solution form, while it was reduced to ~73% in the thin-film form. These measurements demonstrate that the $CsPbBr_3$ perovskite NC layer has a PLQY significantly higher than that of the other down-converting materials for the Si-based receiver, for instance, aluminium tris-(8-hydroxyquinoline) (Alq3), N,N'-diphenyl-N,N'-bis-(3-methylphenyl)-1,1'-biphenyl-4,4'-diamine, bis-(8-hydroxyquinaldine)-chlorogallium ($Gaq'_2Cl$), fluorene copolymers, and SuperYellow. Compared to other organic-based luminescent materials, the improvement in terms of the PLQY is largely ascribed to the increased rate of recombination due to the reduced dimensionality (from a 3D bulk layer to OD NCs), as well as to the unique synthesis method that results in reduced surface defects of NCs and surface passivation by oleic acid and oleylamine ligands. Using this method, the perovskite NCs are less susceptible to variations in the environment and thus yield a higher PLQY even in the form of thin films under ambient environments. Moreover, compared with commercialized CdSe-based NCs with a PLQY of ~30-52% and a PL decay time of a few tens of ns, it is apparent that the PLQY achieved by the $CsPbBr_3$ perovskite NCs is significantly higher, concurrent with a faster PL decay time (<5 ns).

Figure 10:
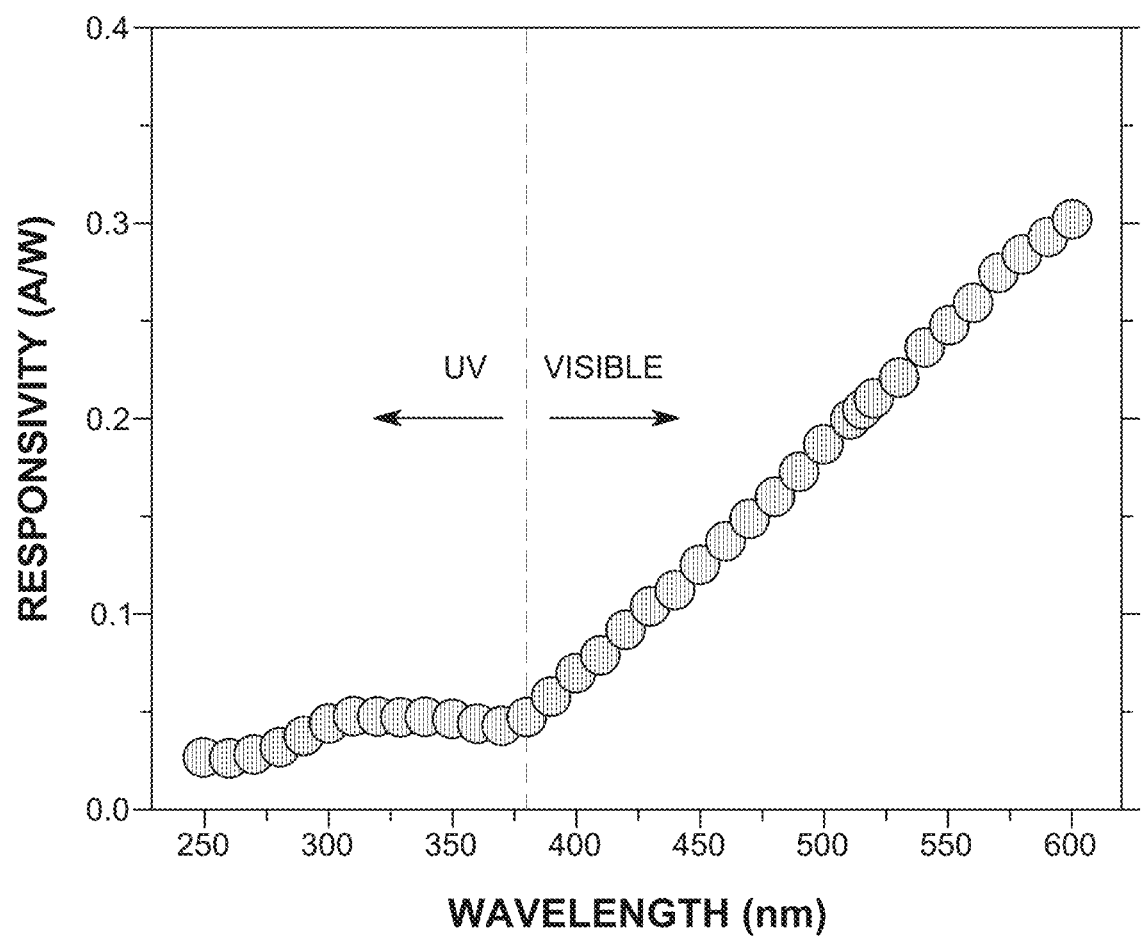
FIG. 10 shows the measured responsivity spectrum of a bare Si-based PD.

An advantage of the receivers 200 and 700 discussed above is the possibility of implementing encoding and decoding of data or information, i.e., to achieve UV-based communication. In this regard, various properties of the UV-based receivers 200 and 700 are now discussed. For effective collection of the light re-emitted from the $CsPbBr_3$ perovskite NC layer 220, the receiver 700 shown in FIG. 7 was used to measure the responsivity of the Si-based PD 202 with and without the addition of the luminescent material. A commercially available Si-based PIN junction photodetector (e.g., made by Thorlabs Inc., FDS100) with an active area of 13 $mm^2$ was used for comparison. FIG. 10 shows the measured responsivity of the commercial Si-based PD. It is evident that the responsivity drops significantly (<0.1 A/W) towards the UV region (<380 nm). This observation can be largely attributed to the low penetration depth, e.g., a few tens of nanometres, of the UV light in the Si-based layer, as known in the art.

To circumvent this issue, the receiver 200 or 700 down-shifts the UV light absorbed by the high-PLQY $CsPbBr_3$ NC layer 220 into the green wavelength region, where the Si-based PDs exhibit a higher responsivity of up to 0.2 NW, as also shown in FIG. 10. Thus, in essence, by using the layer 220, the PD 202 is exposed mainly to green light instead of UV light.

Figure 11A:
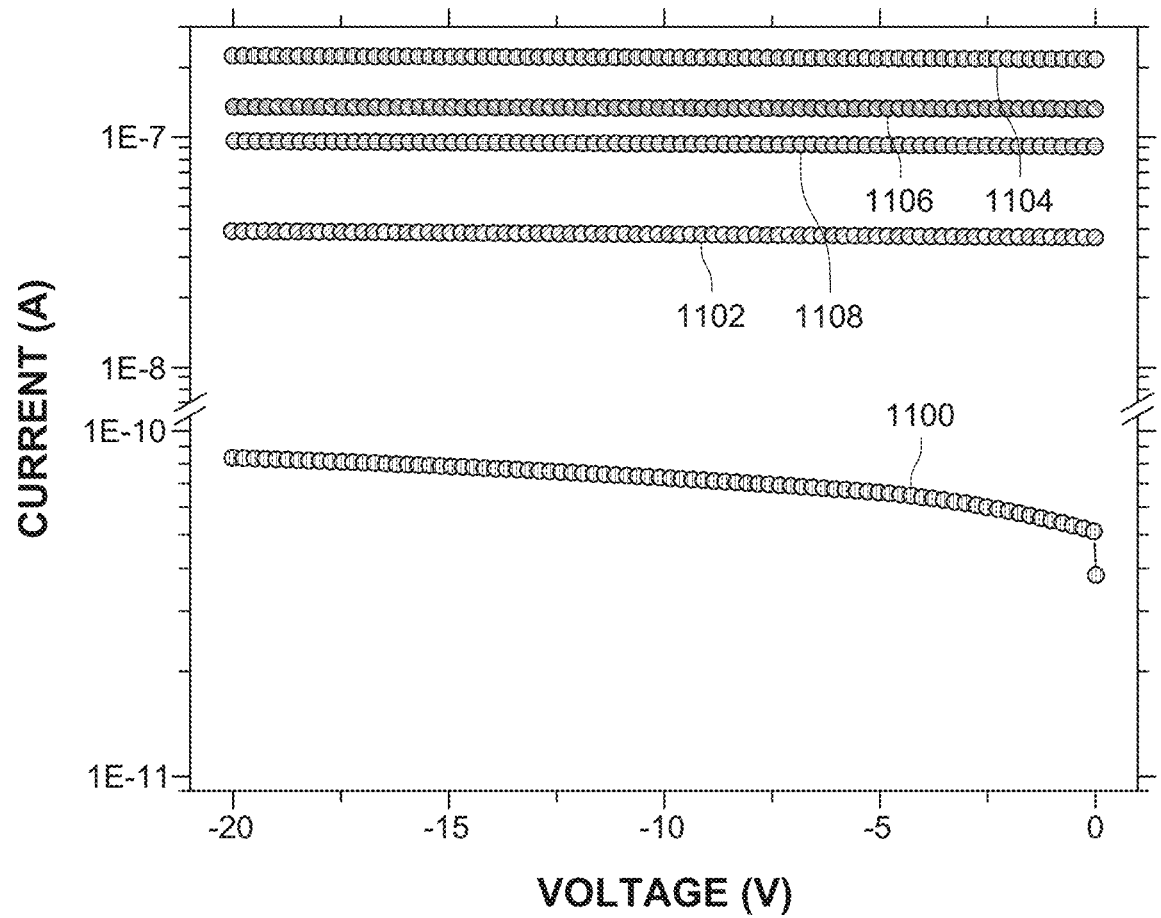
FIG. 11A shows the I-V curves of the Si-based PD with reverse bias from 0 to −20V.

FIG. 11A shows the measured I-V characteristics of the Si-based PD 202 under dark conditions (line 1100) as well as under 270-nm (line 1102) and 510-nm (line 1104) excitation sources from 0 V to −20 V (reverse bias). The incoming light intensity for both measurement wavelengths at 270 nm and 510 nm was calibrated to 8.5 $\mu W/cm^2$ using neutral density (ND) filters. The photocurrent generated under excitation by the 270-nm light source is approximately an order of magnitude lower than that under excitation by the 510-nm light source. Notably, with the addition of the $CsPbBr_3$ perovskite NC layer 220 on the highly UV-transparent quartz substrate 222 in the integrating sphere device 700, the down-conversion approach allows a higher absorption by the Si-based PD 202 even under an excitation by the 270-nm light source, thus generating a higher photocurrent (see line 1106), distinctly closer to that under excitation by the 510-nm source. However, when the $CsPbBr_3$ layer 220 is under illumination, a fraction of the absorbed photons is re-emitted at a longer wavelength, depending on the quantum yield of the enhancement layer, while the remaining fraction of unabsorbed or scattered photons can escape into the Si-based PD 202 without any photon conversion process [1]. These photons will result in additional carriers photogenerated from the two distinct wavelengths (e.g., 510 nm and 270 nm) in the Si-based PD 202.

To evaluate the actual photogenerated carriers of the proposed colour-converting CsPbBr$_3$ NC layer 220, the inventors also measured the resultant I-V characteristics with a 500-nm long pass (LP) filter (e.g., Thorlabs, FELH0500) mounted between the integrating sphere 700 and the Si-based PD 202. By using the LP filter to prevent the unabsorbed UV-wavelength photons from being detected by the Si-based PD 202, as shown in FIG. 11A (see line 1108), the photogenerated carriers remain higher than those under the 270-nm illumination (line 1102) without the CsPbBr$_3$ NC layer 220.

Using the integrating sphere receiver 700, the inventors have also measured the responsivity of the Si-based PD 202 with and without the addition of the CsPbBr$_3$ perovskite NC layer 220 in the UV wavelength region. The responsivity (R) is a key figure of merit for photodetectors, and it can be calculated on the basis of the generated photocurrent ($I_{photocurrent}$) and incident light power ($P_{incident}$) as follows:

$$R = \frac{I_{photocurrent}}{P_{incident}}. \tag{1}$$

Figure 11B:
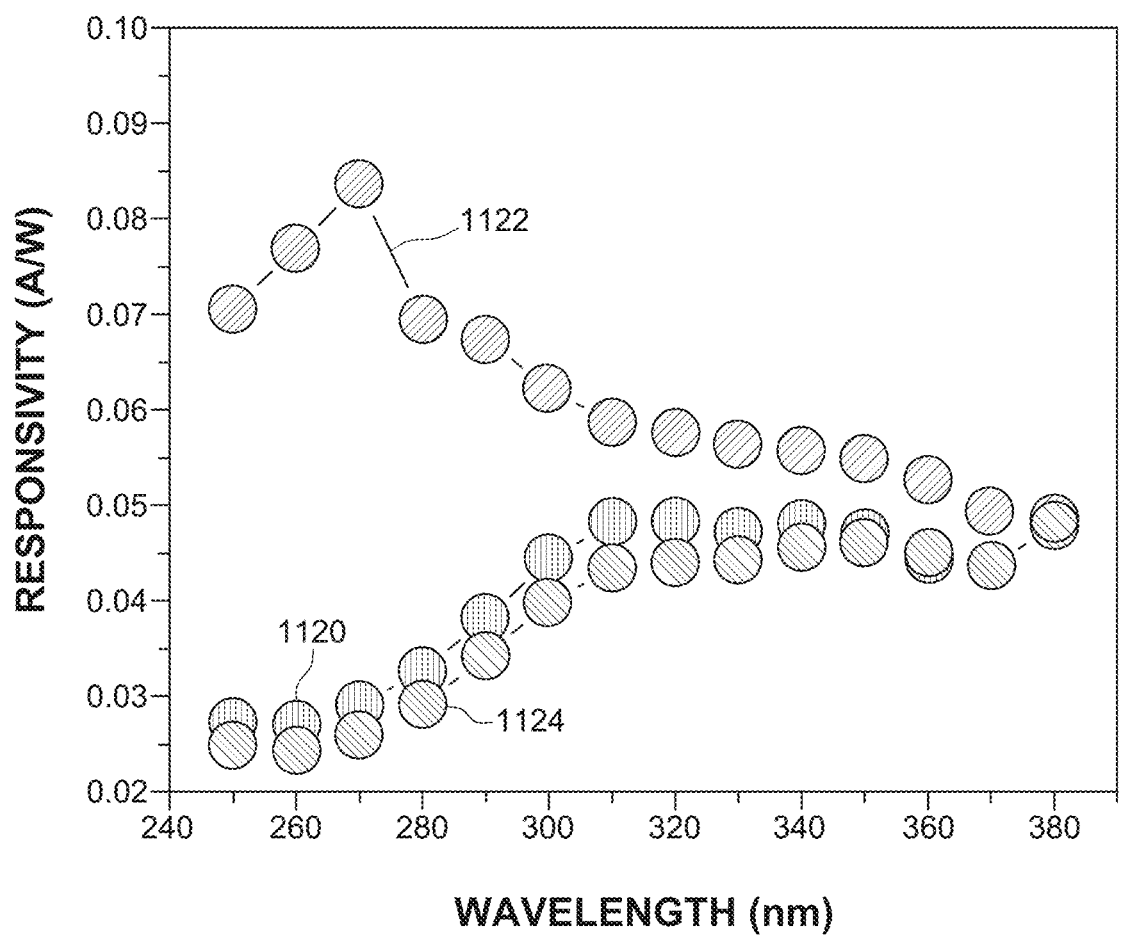
FIG. 11B shows the responsivity spectrum of Si-based PD with bare structure, UV quartz, and $CsPbBr_3$ perovskite layer on the UV quartz.

FIG. 11B shows the responsivity spectrum 1120 of the bare Si PD 202 and the spectrum 1122 of the PD 202 with the insertion of the drop-cast CsPbBr$_3$ perovskite NCs layer 220 in the integrating sphere 700 over the entire UVC to UVA region (250-380 nm). The figure also shows the spectrum 1124 for the bare PD sensor and a UV quartz window. The measurements were taken at 10-nm intervals.

FIG. 11B shows that the responsivity 1122 remains much higher than the responsivity 1120 of the bare Si-based PD 202, particularly in the UVC wavelength region, where the Si-based PD is known to exhibit low responsivity. This improvement can be attributed to the high PLQY and high UVC absorption of the CsPbBr$_3$ NC layer 220. The responsivity decreases towards longer wavelengths due to the reduced light absorption at the near band edge of the CsPbBr$_3$ NC layer 220, which is beyond the intended UV operating wavelength. Nevertheless, the characteristics of the receiver 200 or 700 is comparable to [1], which used an organic-based luminescent material. The organic-based layer in [1] exhibits a reduced photo-response between 250 and 300 nm due to the dip originating from the absorption spectrum.

Comparatively, as shown previously in FIG. 9C, the absorption spectrum of the CsPbBr$_3$ perovskite NC layer 220 increases gradually towards the shorter wavelength region, and thus, the photo-response remains relatively stable even in the deep-UV wavelength region. Moreover, the organic-based layer in [1] is also known to have a long PL decay time, which may limit its practical application in high-speed UV-based communication. The enhanced responsivity of the receivers 200 and 700 could significantly improve the sensitivity and SNR ratio of the PDs, particularly in detecting a low-intensity UVC light source.

Figure 11C:
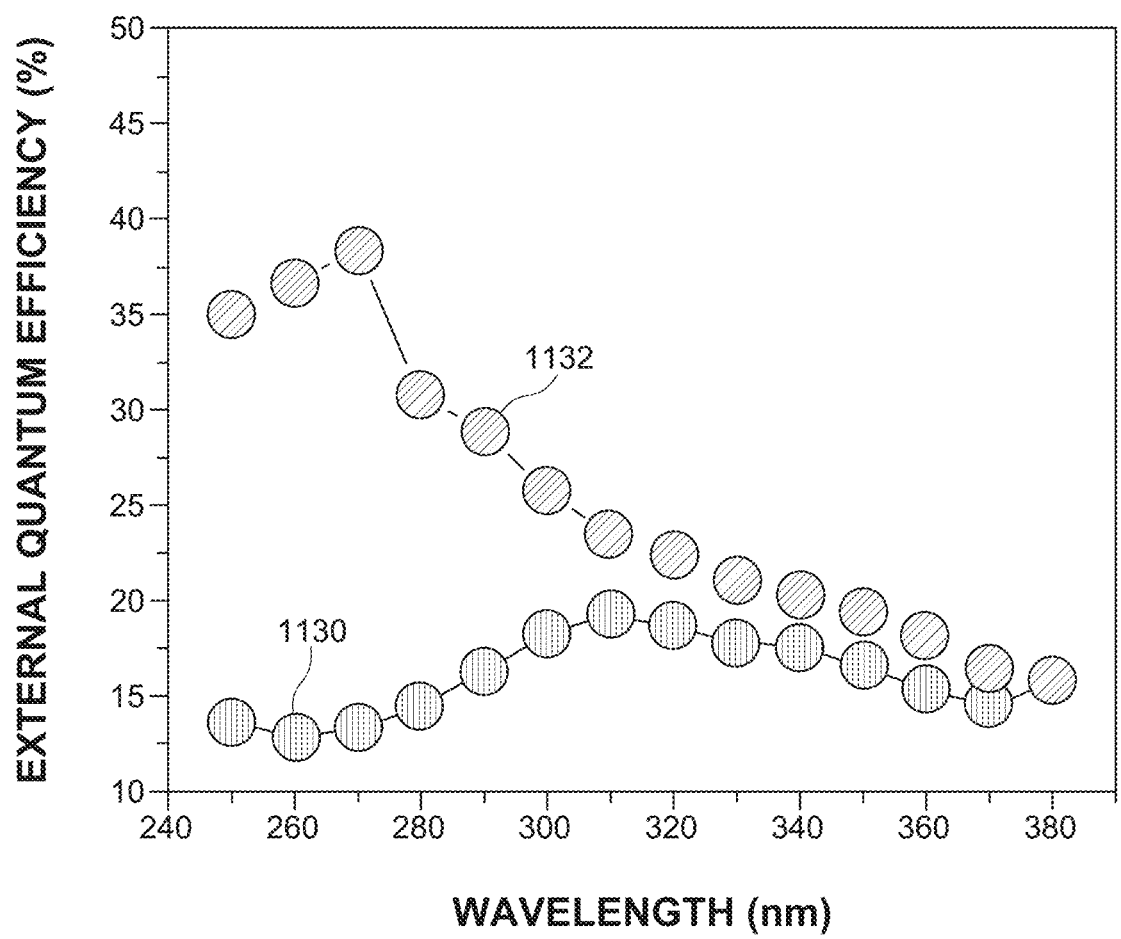
FIG. 11C shows the External Quantum Efficiency (EQE) of the Si-based PD with and without the $CsPbBr_3$ perovskite layer on the UV quartz substrate.

Furthermore, the inventors calculated the photon conversion efficiency, which is also known as the external quantum efficiency (EQE), of the Si-based PD 202 with and without the addition of the CsPbBr$_3$ perovskite NC layer 220 in the integrating sphere receiver 700. The EQE is the ratio of the electron-hole pairs generated by the photodiode to the incident photons:

$$EQE = \frac{R_\lambda}{\lambda_{incident}} \times \frac{hc}{e}, \tag{2}$$

where $R_\lambda$ is the responsivity in A/W, $\lambda_{incident}$ is the excitation wavelength in nanometres, h is Planck's constant, c is the speed of light in vacuum, and e is the elementary charge. Based on the measured responsivity, the calculated EQE 1130 for the bare Si-based PD 202 and the EQE 1132 for the PD 202 with the inclusion of the CsPbBr$_3$ perovskite NC layer 220 in the integrating sphere receiver 700 are shown in FIG. 11C. By using the CsPbBr$_3$ perovskite NCs 220, a high EQE 1132 of up to 38% is observed at 270 nm, due to the enhanced photon absorption and an increase in the photogenerated carriers after the photon conversion process. It is noteworthy that about up to 25% increment in the external quantum efficiency was observed at the wavelength of 270 nm. The significantly improved EQE in the UVC wavelength region is attributed to the enhanced photon absorption and increase in the photogenerated carriers after the photon conversion process. It is also worth noting that the carrier multiplication process is not evident because the EQE of the photodetector in the UV wavelength region remains lower than that in the green wavelength region, i.e., ~46.41% at 510 nm.

The EQE peak observed at approximately 270 nm corresponds well with the peak position of the absorption spectrum, as shown previously in FIG. 9C, where it exhibits higher photon absorption than that beyond 300 nm. This phenomenon results in a higher number of photons being converted to a longer wavelength, where the Si-based PD 202 exhibits a higher responsivity. The absorption coefficient at 270 nm was estimated to be $1.16 \times 10^3$ cm$^{-1}$, which is comparatively higher than that in the 350 nm band of approximately $0.89 \times 10^3$ cm$^{-1}$.

Figure 11D:
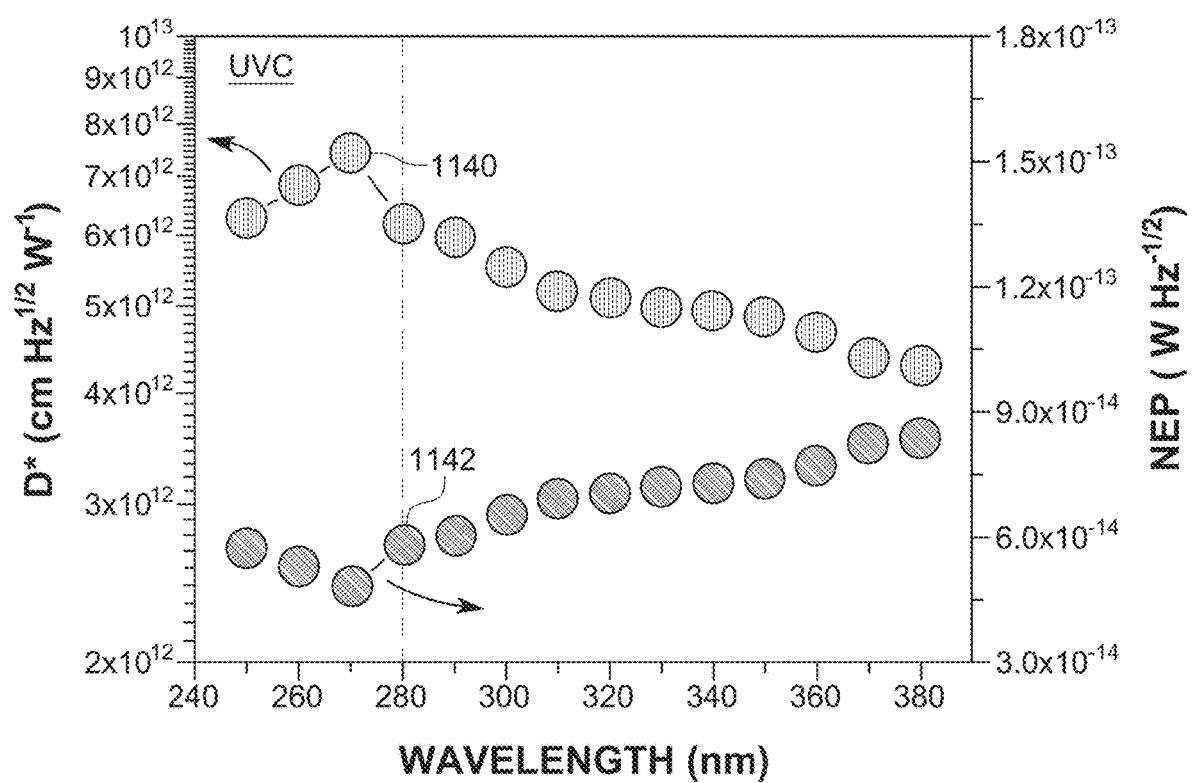
FIG. 11D shows the specific detectivity and noise equivalent power (NEP) of the receivers presented in the previous figures.

Another relevant parameter for evaluating the performance of a PD, i.e., the specific detectivity (D*) was also calculated based on Equation (3) as shown below:

$$D^* = \frac{A^{\frac{1}{2}}}{NEP} = \frac{(R\lambda)(A^{\frac{1}{2}})}{(2eI_d)^{\frac{1}{2}}}, \tag{3}$$

where A is the device area in cm$^2$, NEP is the noise equivalent power in W Hz$^{-1/2}$, e is the elementary charge of $1.602 \times 10^{-19}$ coulombs, $I_d$ is the dark current in amperes, and RA is the responsivity in A/W. The D* 1140 of the hybrid CsPbBr$_3$—Si photodetection receiver 200 or 700, as shown in FIG. 11D, is determined to be $7.4 \times 10^{-12}$ cm Hz$^{1/2}$ W$^{-1}$ at 270 nm, which is higher than the D* 1142 of the bare Si photodetection detector 202, with a value of $2.5 \times 10^{-12}$ cm Hz$^{1/2}$ W$^{-1}$ at the same measurement wavelength.

In addition, the noise-related performance of the proposed receiver was also evaluated based on the noise equivalent power (NEP). NEP is defined as the amount of input optical power that generates an output photocurrent equal to the noise current to yield an SNR of 1. As calculated based on Equation (3), in the UVC region, the NEP for the bare Si-based photodetector was calculated to be as high as $1.49 \times 10^{-13}$ and $1.40 \times 10^{-13}$ W Hz$^{-1/2}$ for 250 nm and 270 nm, respectively. By using the proposed colour-converting scheme with CsPbBr$_3$ perovskite NCs layer 220, the NEP is reduced by more than a half-order of magnitude to $5.75 \times 10^{-14}$ and $4.86 \times 10^{-14}$ W Hz$^{-1/2}$ for the same measurement wavelengths at 250 nm and 270 nm. By using the proposed colour-converting scheme, the lower NEP compared to that of the bare Si-based PD contributes to the lower noise floor and enhanced detectivity, particularly in the UVC wavelength region.

A comparison of the novel receiver's performance to various commercial and modified Si-based photodetectors is summarized in FIG. 12. For the receiver 200/700 (listed in the last row of the table), although its modulation bandwidth is lower than some of the traditional devices, the PLQY in the receiver 200/700 is significantly higher by approximately 30% when the NCs are drop-cast in the form of a thin film, and thus, a higher photon conversion efficiency is exhibited that can improve photodetection. Moreover, the lower modulation bandwidth in the receivers 200/700 compared to prior work could be attributed to the competing band states and dynamics of recombination mechanisms in the $CsPbBr_3$ perovskite NCs. Compared to other existing device, FIG. 12 indicates the superior performance of the $CsPbBr_3$ perovskite NC layer 220 with a high PLQY and a fast PL decay time for a novel receiver design and potential monolithic integration with a Si-based receiver 202 in a UV-based communication link.

To further investigate the photostability of the $CsPbBr_3$ perovskite NC layer 220 for the UV-based communication link, the inventors performed a 24-h PL stress test in an ambient environment under intense UVC illumination. The gradual increase in the PL intensity in the first 3 h could be attributed to the evaporation of reduced solvents and the formation of additional emissive centres linked to the dynamics of $CsPbBr_3$ perovskite NCs. In the subsequent 12 h, the PL intensity remained stable under ambient conditions. The photostability exceeds that of other untreated $CsPbBr_3$ perovskite NCs, which degrade within a few hours. The reduction of the PL intensity after 16 h of intense continuous irradiation under a focused UVC light source is most likely due to the thermal degradation and photooxidation of lead atoms. The performance of the $CsPbBr_3$ perovskite NC layer 220 could be further increased, for example, by coating of strongly hydrophobic silicone resin on perovskite-based NC thin films, which has been shown to improve the photostability and water resistance properties.

Figure 13A:
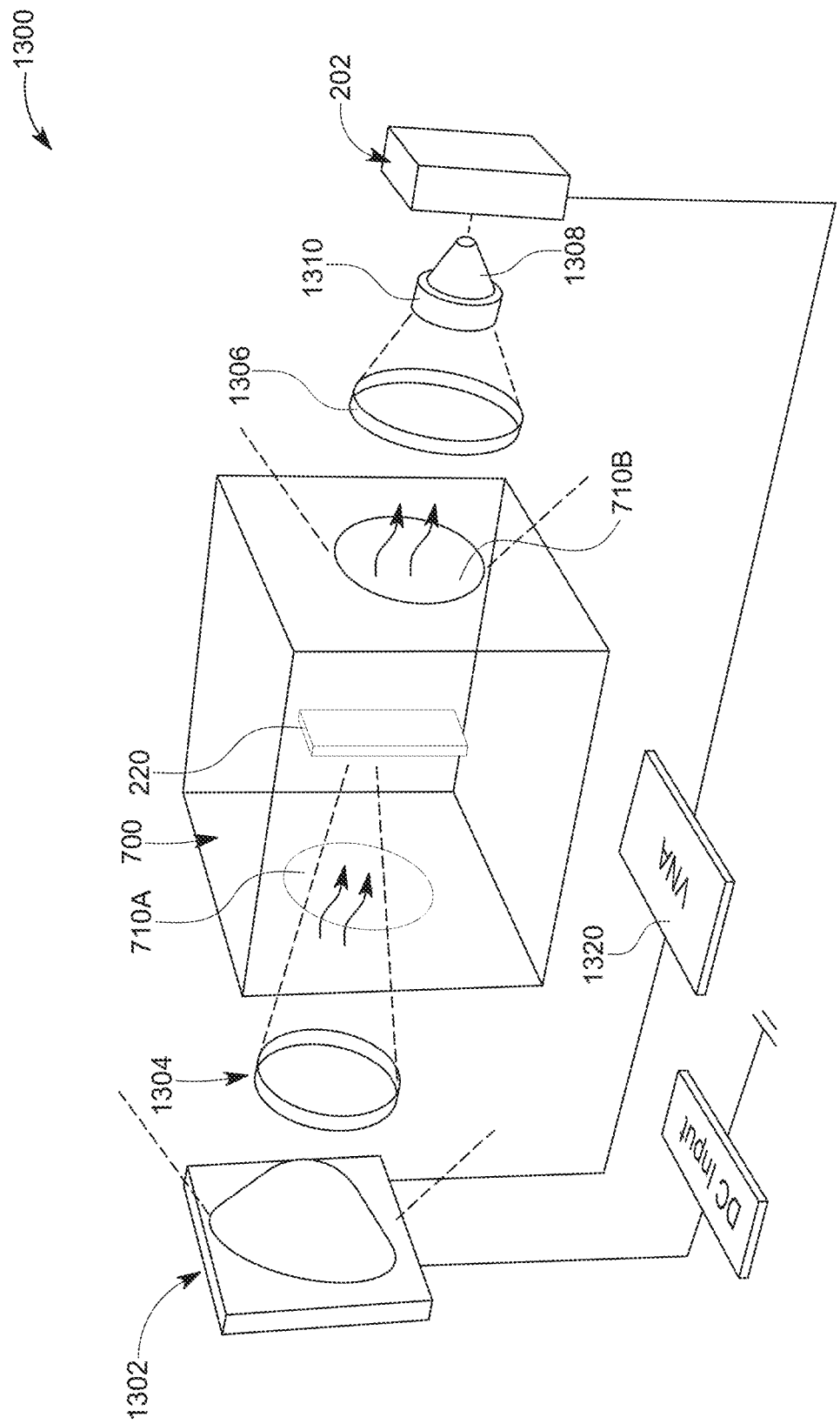
FIG. 13A illustrates a configuration for measuring a modulation bandwidth of the receivers presented in the previous figures.

To investigate the potential application of the $CsPbBr_3$ perovskite NC layer 220 to the UV-based communication link, the small-signal modulation bandwidth of the $CsPbBr_3$ perovskite NCs layer was measured using the configuration 1300 shown in FIG. 13. To eliminate the bandwidth constraints from the emitter and other parts of the receiver, a 70-mW 375-nm UV laser diode (LD) 1302 with a high modulation bandwidth of up to a few GHz and a Si-based avalanche photodetector (APD) 202 with a device area of 0.2 mm and a tuneable gain of up to $5 \times 10^5$ V/W were used. The UV light was guided through a plano-convex lens 1304 to the input 710A of the receiver 700 and focused onto the $CsPbBr_3$ perovskite NC layer 220 inside the integrating sphere receiver 700. Another series of plano-convex lenses 1306 and an objective lens 1308 were set up at the output port 710B of the receiver 700 to collect the photons re-emitted from the $CsPbBr_3$ perovskite NC layer 220. Before entering the APD 202, the UV light was filtered using a 500-nm long-pass filter 1310.

Figure 13B:
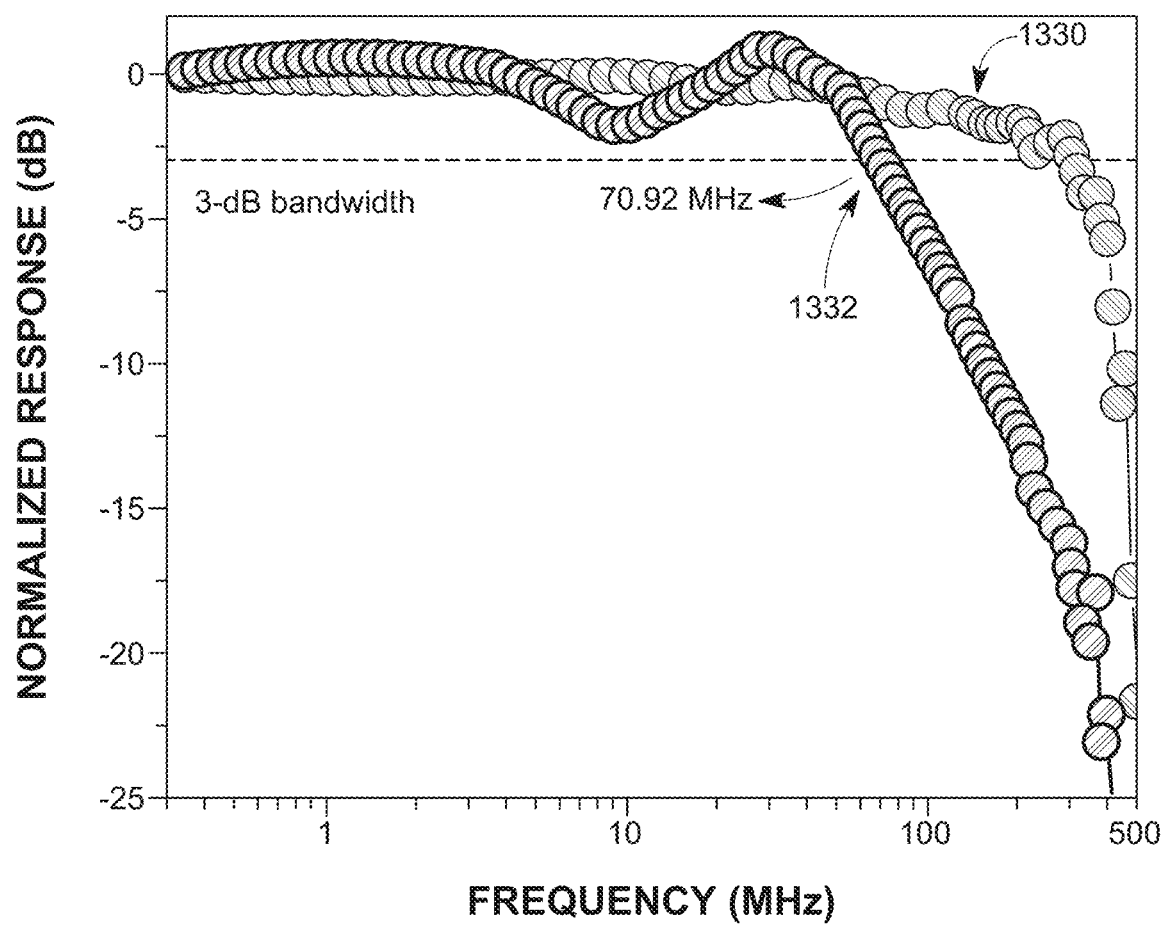
FIG. 13B illustrates the normalized frequency response of such receivers to a given input light.

By sweeping the sinusoidal AC modulation signal, applied to the LD 1302 by the controller 1320, from 300 kHz to 3 GHz, as shown in FIG. 13B, the 3-dB bandwidth 1330 of the system without $CsPbBr_3$ perovskite NCs 220 is determined to be approximately 380 MHz. With the addition of the $CsPbBr_3$ perovskite NC layer 220 and the 500-nm long-pass filter 1310, a 3-dB bandwidth 1332 of approximately 70.92 MHz is obtained. The gradual dip of the normalized response at 10 MHz arises from the overall frequency response of the system when the $CsPbBr_3$ perovskite NCs layer 220 is inserted into the receiver 700. Such a gradual dip is within the −3 dB bandwidth, and this can be corrected through power pre-equalization or post-equalization in the eventual system implementation using electronic hardware or software processing.

Apart from the enhanced responsivity relative to the Si-based PD 202, this enhanced bandwidth has great potential for integration with a high-speed Si-based PD targeted at the UVC communication link. By taking advantage of the short carrier recombination lifetime (~ns), the demonstrated modulation bandwidth under UV excitation is significantly higher than that in the case of $YAM:Eu^{3+}$-based (~msec), $Sr_5(PO_4)_{3-x}(BO_3)_xCl:0.04Eu^{2+}$-based (~µsec), and $Ca_8MgLu_{1-x}(PO_4)_7:xTb^{3+}$-based (~msec) phosphors. In addition, the demonstrated high bandwidth of few tens of MHz is sufficiently higher than any other phosphor material, demonstrating its potential for high-speed data communication in UV-based applications while also fulfilling the requirements for IEEE 802.11a, b and g standard in the Mbps range.

The high modulation bandwidth demonstrated in the $CsPbBr_3$ perovskite NC layer 220 also surpasses those of other colloidal semiconductor NC-based photodetectors, e.g., CdSe quantum dots (~50 kHz). Moreover, although some of the published studies have demonstrated a high modulation bandwidth of up to hundreds of megahertz, reduced absorption and a low PLQY in the UV region were also observed for those devices, which restricts the application of these materials in the UV communication field.

Figure 14A:
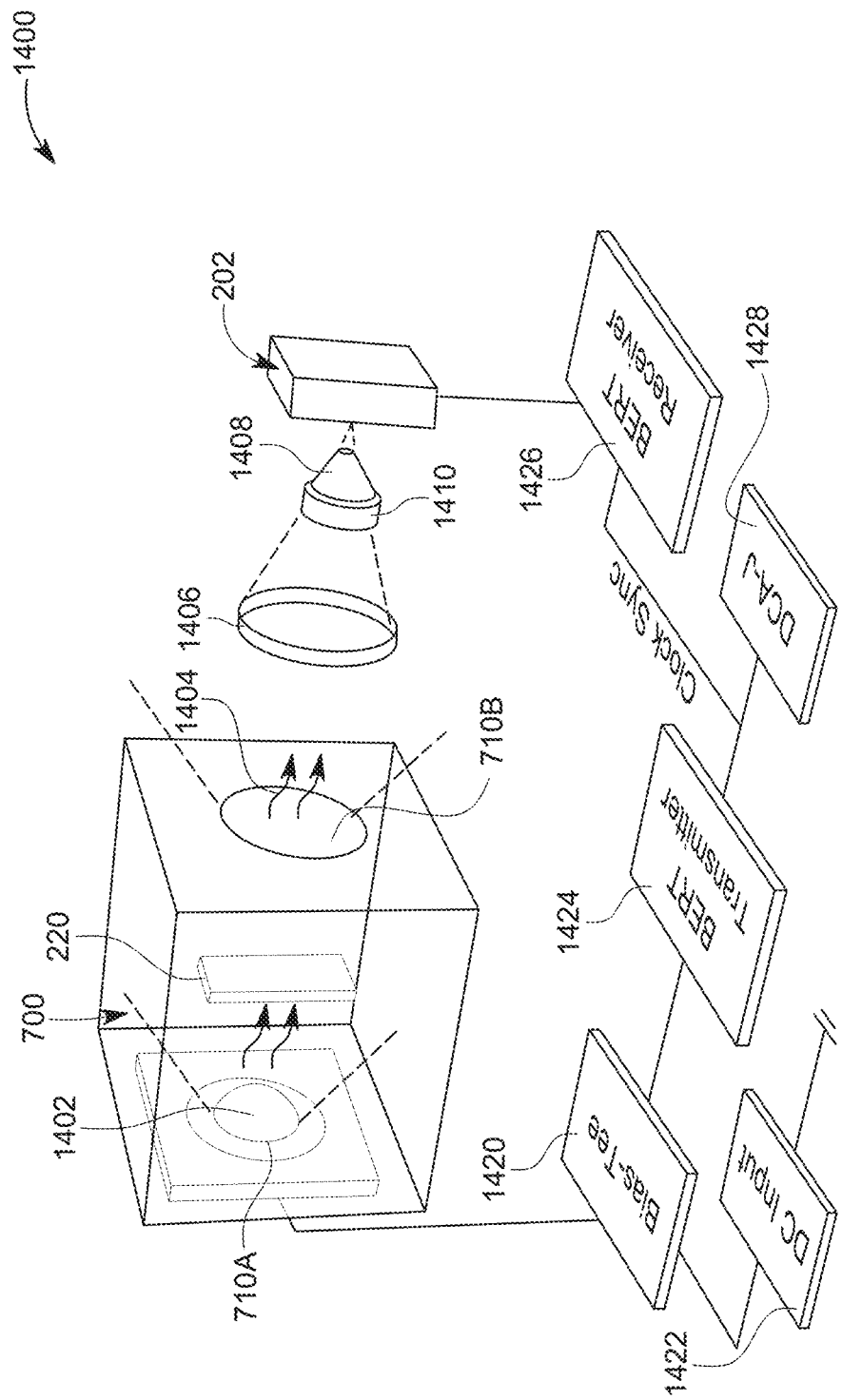
FIG. 14A illustrates a configuration for measuring data transmission characteristics of the receivers presented in the previous figures.

The inventors have also demonstrated that the $CsPbBr_3$ perovskite NC layer 220 can be used as a colour-converting luminescent material for Si-based PDs in the solar-blind UVC communication link by using the on-off keying (OOK) modulation scheme. In the OOK modulation, a pseudorandom binary sequence (PRBS) $2^{10}-1$ data format was sent to optically modulate the transmitter, where the 1s or 0s of the digital data were represented by the presence or absence of the carrier wave, respectively. The OOK modulation may be implemented in the processing device 208 illustrated in FIG. 2. In this regard, processing device 208 may include a processor that is structured to decode signals received at the receiver 200/700. As shown in FIG. 14A, a configuration 1400 includes a 278-nm UVC LED 1402 to excite the $CsPbBr_3$ perovskite NC layer 220 in the receiver 700, while the green luminescence 1404 generated by the $CsPbBr_3$ perovskite NC layer 220 was passed through a series of plano-convex lenses 1406, an objective lens 1408, and a 500-nm long-pass filter 1410 before entering the Si-based APD 202. A DC bias of 6 V and an AC modulated peak-to-peak voltage of 2 $V_{p-p}$ were supplied by a bias-tee 1420 to the LED 1402. The bias-tee 1420 is connected to a DC supply 1422 and to a BER tester 1424 for the transmitter end. The BER tester 1424 is electrically connected to a BER tester 1426 at the receiver end, and the BER tester 1426 receives the electrical signals generated by the PD 202. A multi-functional analysis tool 1428 may be connected to the BER testers for measuring various electrical parameters.

At 6-V DC bias, the emitted light output power was measured to be approximately 0.8 mW. The distance between the UVC LED 1402 and the $CsPbBr_3$ perovskite NC layer 220 was 3.5 cm in this configuration, while the distance from the $CsPbBr_3$ perovskite NC layer 220 to the Si-based APD 202 was approximately 20 cm. Note that in this embodiment, the UVC LED 1402 was placed at the inlet port 710A. For comparison, the inventors also measured the BER achieved at different data rates in the case of the UV LED 1402 only, without the $CsPbBr_3$ perovskite NC layer 220 and the 500-nm long-pass filter 1410, as shown in FIG.

Figure 14B:
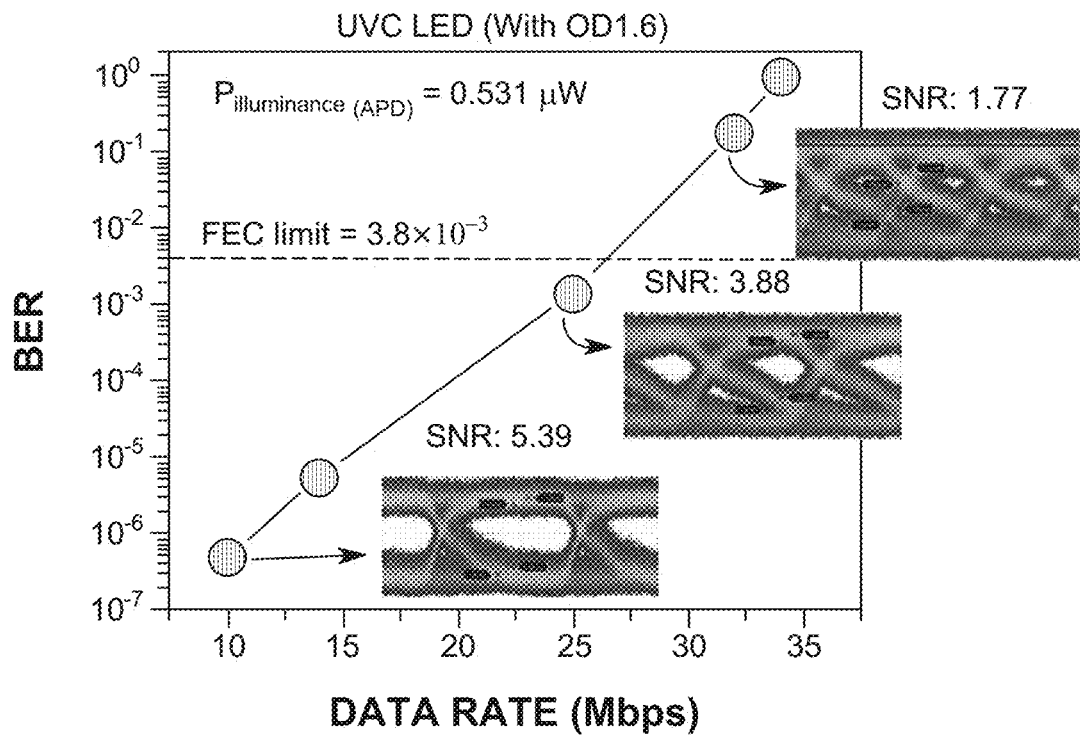
FIG. 14B illustrates the bit-error-ratio (BER) of the data transmission with a traditional receiver.

14B. An optical density (OD) filter of 1.6 was used to reduce the optical power illuminating the APD 202, where the measured illuminated power before the APD was approximately 0.531 µW, well below the saturation limit of the APD. Prior to this, the system bandwidth was also measured, where the 3-dB bandwidth was limited to 11.13 MHz owing to the limitations at the transmitter end. In the case of the UVC LED only, the highest achievable data rate was recorded as 25 megabits per second (Mbps), with a measured BER of $1.4 \times 10^{-3}$, which is below the forward error correction (FEC) limit of $3.8 \times 10^{-3}$. The inset of FIG. 14B shows the corresponding eye diagram with an SNR ratio of approximately 3.88 and a near-closed eye diagram for data rates above the FEC limit.

Figure 14C:
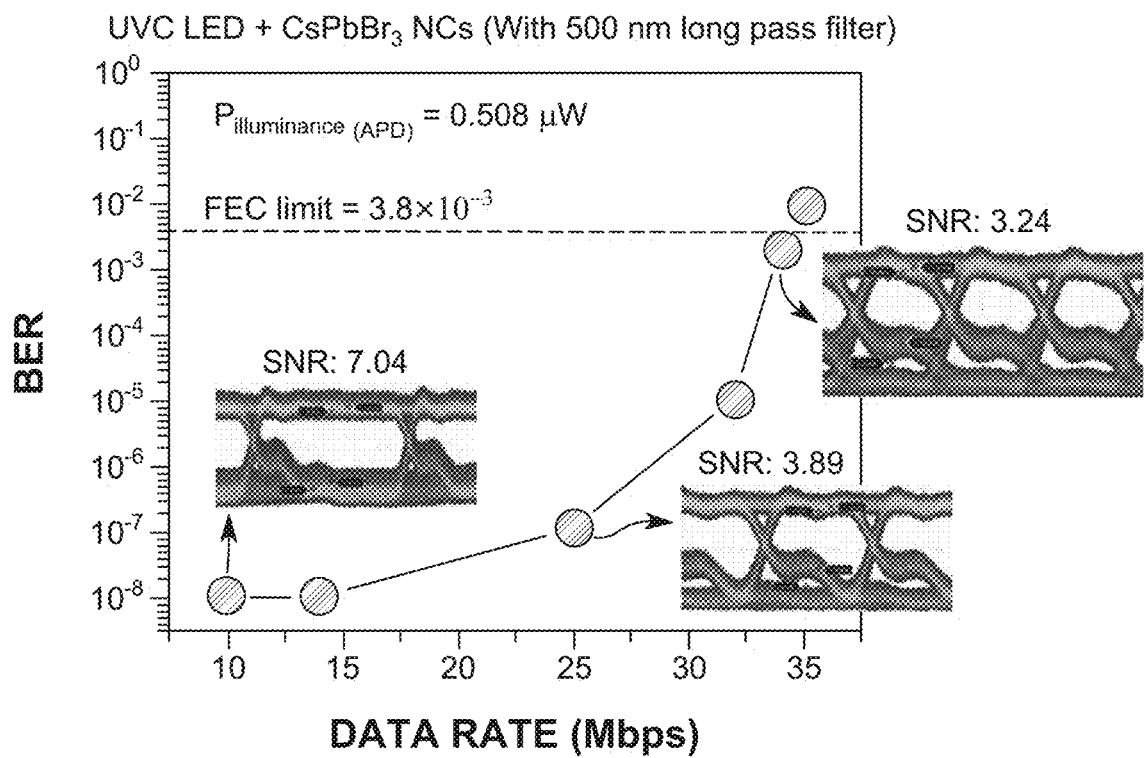
FIG. 14C illustrates the BER of the data transmission with a receiver presented in the previous figures.

When the colour-converting $CsPbBr_3$ perovskite NC layer 220 was used, higher data rates of 34 Mbps and an SNR of 3.24 are achieved, as shown in FIG. 14C, due to the higher optical sensitivity of the Si-based APD 202 to green wavelengths instead of UV wavelengths. The inset of FIG. 14C shows the corresponding eye diagram at 34 Mbps. In the case of the $CsPbBr_3$ perovskite NCs, the measured optical power illuminating the APD, after the 500-nm long-pass filter, is 0.508 µW. Given the similar optical powers illuminating the APD at two different wavelengths, i.e., 278 nm and 506 nm, a higher amplitude of the output voltage ($V_{out}$), a higher received signal power, and a high SNR in the case of the $CsPbBr_3$ perovskite layer 220 can be expected on the basis of the following equation:

$$V_{out} = P_{illuminance} \times R_\lambda \times G \quad (4)$$

where $V_{out}$ is the output voltage, $P_{illuminance}$ is the power illuminating the APD, $R_\lambda$ is the responsivity of the Si-based APD at different wavelengths, and G is the transimpedance gain. By using a colour-converting luminescent material at the receiver end, [3] demonstrated an enhanced signal and optical gain compared to a communication link directly using a blue LED. However, in that work, a low absorption was observed in the UV wavelength region, which restricted the application of their material to a UV-based communication link.

The achieved data rates can be further improved by using a more complex modulation scheme (e.g., orthogonal frequency-division multiplexing), pre-equalization, bit loading, and power allocation. Moreover, with the improvement in the modulation bandwidth of the solar-blind UVC LED and realization of the UVC LD, a higher modulation bandwidth of up to hundreds of megahertz can be expected in the near future for receivers similar to those discussed herein.

The novel receivers 200 and 700 show a nearly three-fold improvement in the responsivity and an approximately 25% increase in the EQE. These receivers demonstrated that it is possible to use the hybrid $CsPbBr_3$-silicon color convertor to achieve a large small-signal modulation bandwidth of 70.92 MHz and a high data rate of up to 34 Mbps in a solar-blind UVC communication link. This approach based on a composition-tunable perovskite-based phosphor exploits the feasibility of monolithic integration with low-cost and mature Si-based devices for high-speed UV photodetection. While the above discussion focused on the $CsPbBr_3$ perovskite NC layer 220, it is possible to use other inorganic or organic materials for converting the UV light into visible light.

Figure 15:
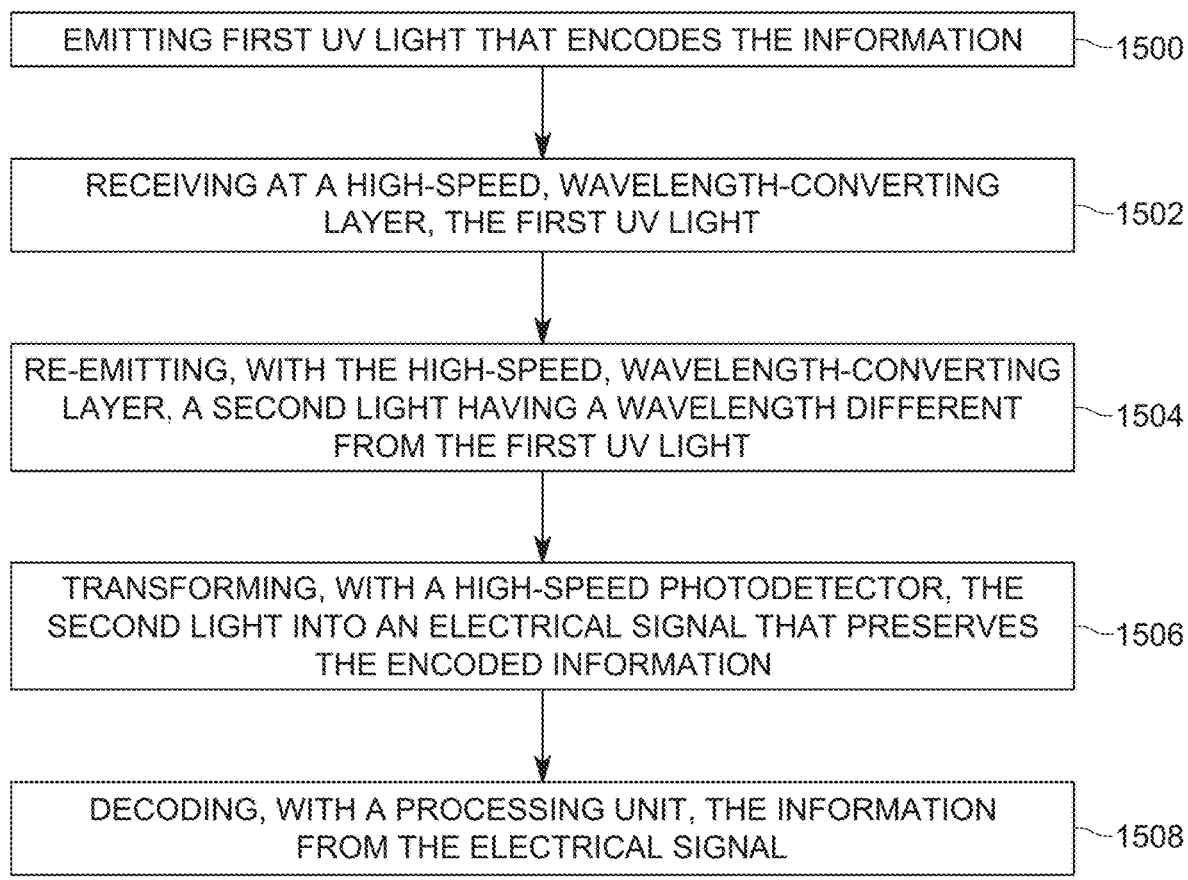
FIG. 15 is a flowchart of a method for transmitting data using UV light and a receiver having high-speed, wavelength-converting layer.

According to an embodiment illustrated in FIG. 15, there is a method for transmitting data using UV light. The method includes a step 1500 of emitting first UV light 240 that encodes the information, a step 1502 of receiving at a high-speed, wavelength-converting layer 220 the first UV light 240, a step 1504 of re-emitting with the high-speed, wavelength-converting layer 220 a second light 242 having a wavelength different from the first UV light, a step 1506 of transforming with a high-speed photodetector 202 the second light 242 into an electrical signal 244 that preserves the encoded information, and a step 1508 of decoding with a processing unit 208 the information from the electrical signal 244. A material of the high-speed, wavelength-converting layer 220 is configured to respond to a change in a light intensity with a speed of at least few megabits per second. In one application, the second light is visible light. The material may include $CsPbBr_3$ perovskite nanocrystals and the high-speed photodetector is Si-based.

The disclosed embodiments provide a method and system for data communication using UV light. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] Levell, J. W., Giardini, M. E. & Samuel, I. D. W. A hybrid organic semiconductor/silicon photodiode for efficient ultraviolet photodetection. *Optics Express* 18, 3219-3225 (2010).
[2] Kuhlmann, W. Photodetector for ultraviolet light radiation. (2004).
[3] Dong, Y. R. et al. Nanopatterned luminescent concentrators for visible light communications. *Optics Express* 25, 21926-21934 (2017).
[4] Zhang, M. J. et al. Perovskite quantum dots embedded composite films enhancing UV response of silicon photodetectors for broadband and solar-blind light detection. *Advanced Optical Materials* 6, 1800077 (2018).

What is claimed is:
1. A high-speed, perovskite-based wavelength-converting receiver, the receiver comprising:
   a housing;
   a high-speed, wavelength-converting layer attached to the housing and configured to absorb, at a first face, a first light having a first wavelength range and emit, at a second face, opposite to the first face, a second light having a second wavelength range, which is different from the first wavelength range; and a high-speed photodetector attached to the housing and having an active face configured to absorb the second light having the second wavelength range and generate an electrical signal, wherein the active face of the photodetector is fully placed within a chamber defined by the housing, the second face of the high-speed, wavelength-converting layer, and the active face of the high-speed photodetector, and wherein the first light is ultraviolet (UV) light and the second light is visible light.

2. The receiver of claim 1, wherein a material of the high-speed, wavelength-converting layer is configured to respond to a change in a light intensity with a speed of at least megabits per second.

3. The receiver of claim 1, wherein the high-speed, wavelength-converting layer is an organometallic or inorganic halide perovskite having a lifetime less than 50 ns.

4. The receiver of claim 1, wherein the high-speed, wavelength-converting layer includes $ABX_3$ perovskite nanocrystals wherein A is selected from $Cs^+$, $Rb^+$, $CH_3NH_3^+$, and $HC(NH_2)_2^+$, B is selected from $Pb^{2+}$, $Sn^{2+}$, $Ge^{2+}$, $Mg^{2+}$, $Ca^{2+}$, $Sr^{2+}$, $Ba^{2+}$, $Cu^{2+}$, $Fe^{2+}$, $Pd^{2+}$, and $Eu^{2+}$, and X is a halogen $Cl^-$, $Br^-$ or $I^-$.

5. The receiver of claim 1, wherein the high-speed, wavelength-converting layer includes $CsPbBr_3$ perovskite nanocrystals.

6. The receiver of claim 1, wherein the high-speed photodetector is an Si- or group-Ill-nitride-based photodetector.

7. The receiver of claim 1, wherein the high-speed photodetector is targeting high-speed for the second light but not for the first light for a wavelength-selective application.

8. The receiver of claim 1, wherein a wall of the housing, the high-speed photodetector and a substrate on which the high-speed, wavelength-converting layer is formed define the chamber, and the active face of the high-speed photodetector is fully placed inside the chamber.

9. The receiver of claim 1, further comprising:
a highly-reflective optical element placed over the high-speed, wavelength-converting layer, for filtering out visible light from the first light;
a UV-transparent microlens placed over the highly-reflective optical element; and
a coated-noise filter attached to the UV-transparent microlens.

10. The receiver of claim 1, wherein a UV transparent substrate is formed directly over the high-speed photodetector and the high-speed, wavelength-converting layer is formed directly over the UV transparent substrate.

11. The receiver of claim 1, further comprising:
cladding layers sandwiching sides of the high-speed, wavelength-converting layer,
wherein the high-speed, wavelength-converting layer is formed directly on the high-speed photodetector.

12. The receiver of claim 11, wherein a refractive index of the cladding layers is smaller than a refractive index of the high-speed, wavelength-converting layer.

13. A high-speed, perovskite-based wavelength-converting receiver, the receiver comprising:
a housing having a spherical interior chamber, the spherical interior chamber having an inlet port for receiving a first light having a first wavelength range, and having an outlet port for releasing a second light having a second wavelength range, which is different from the first wavelength range;

a high-speed, wavelength-converting layer located inside the spherical interior chamber and configured to absorb the first light and emit the second light; and a high-speed photodetector located outside the housing, at the outlet port, and having an active face configured to absorb the second light having the second wavelength range and generate an electrical signal, wherein a material of the high-speed, wavelength-converting layer is configured to respond to a change in a light intensity with a speed of at least megabits per second, wherein the first light is ultraviolet (UV) light and the second light is visible light.

14. The receiver of claim 13, wherein the high-speed, wavelength-converting layer is an organometallic or an inorganic halide perovskite having a lifetime less than 50 ns.

15. The receiver of claim 13, wherein the high-speed, wavelength-converting layer includes $ABX_3$ perovskite nanocrystals wherein A is selected from $Cs^+$, $Rb^+$, $CH_3NH_3^+$, and $HC(NH_2)_2^+$, B is selected from $Pb^{2+}$, $Sn^{2+}$, $Ge^{2+}$, $Mg^{2+}$, $Ca^{2+}$, $Sr^{2+}$, $Ba^{2+}$, $Cu^{2+}$, $Fe^{2+}$, $Pd^{2+}$, and $Eu^{2+}$, and X is a halogen $Cl^-$, $Br^-$ or $I^-$, and the high-speed photodetector is Si-based.

16. The receiver of claim 13, wherein the high-speed, wavelength-converting layer includes $CsPbBr_3$ perovskite nanocrystals and the high-speed photodetector is an Si- or group-Ill-nitride-based photodetector.

17. The receiver of claim 13, further comprising:
a high UV-reflective coating on the spherical interior chamber; and
a highly transparent substrate on which the high-speed, wavelength-converting layer is directly formed.

18. A method for transmitting information using ultraviolet (UV) light, the method comprising:
emitting first UV light that encodes the information;
receiving, at a first face of a high-speed, perovskite-based wavelength-converting layer, the first UV light;
re-emitting, at a second face of the high-speed, wavelength-converting layer, which is opposite to the first face, a second light having a wavelength different from the first UV light, wherein the second light is visible light;
transforming, with a high-speed photodetector, the second light into an electrical signal that preserves the encoded information, wherein the second light travels through a chamber, prior to arriving at the high-speed photodetector, and the chamber is defined by a housing, the second face of the high-speed, wavelength-converting layer, and the high-speed photodetector; and
decoding, with a processing unit, the encoded information from the electrical signal,
wherein a material of the high-speed, wavelength-converting layer is configured to respond to a change in a light intensity with a speed of at least megabits per second.

19. The method of claim 18, wherein the high-speed, wavelength-converting layer includes $CsPbBr_3$ perovskite nanocrystals and the high-speed photodetector is Si-based.

20. The method of claim 18, wherein the high-speed, wavelength-converting layer is an organometallic or an inorganic halide perovskite having a lifetime less than 50 ns.

21. The method of claim 18, wherein the high-speed, wavelength-converting layer includes $ABX_3$ perovskite nanocrystals wherein A is selected from $Cs^+$, $Rb^+$, $CH_3NH_3^+$, and $HC(NH_2)_2^+$, B is selected from $Pb^{2+}$, $Sn^{2+}$, $Ge^{2+}$, $Mg^{2+}$, $Ca^{2+}$, $Sr^{2+}$, $Ba^{2+}$, $Cu^{2+}$, $Fe^{2+}$, $Pd^{2+}$, and $Eu^{2+}$, and X is a halogen $Cl^-$, $Br^-$ or $I^-$, and the high-speed photodetector is Si-based.

* * * * *